United States Patent
Choi et al.

(10) Patent No.: US 8,731,553 B2
(45) Date of Patent: May 20, 2014

(54) COOPERATIVE COMMUNICATION METHODS AND A DEVICE FOR A TARGET TERMINAL AND A COOPERATIVE TERMINAL

(75) Inventors: Hyun Ho Choi, Suwon-si (KR); Dong Ho Cho, Seoul (KR); Won Jong Noh, Yongin-si (KR); Won Jae Shin, Yongin-si (KR); Jung Min Moon, Seoul (KR); Chang Bae Yoon, Seoul (KR); Dong Jo Park, Daejeon (KR); Sang Uk Park, Seoul (KR)

(73) Assignees: Samsung Electronics Co., Ltd., Suwon-si (KR); Korea Advanced Institute of Science and Technology, Daejeon (KR)

(*) Notice: Subject to any disclaimer, the term of this patent is extended or adjusted under 35 U.S.C. 154(b) by 196 days.

(21) Appl. No.: 13/295,637

(22) Filed: Nov. 14, 2011

(65) Prior Publication Data

US 2012/0142345 A1   Jun. 7, 2012

(30) Foreign Application Priority Data

Dec. 1, 2010   (KR) .................. 10-2010-0121522

(51) Int. Cl.
*H04W 48/16* (2009.01)

(52) U.S. Cl.
USPC ......... 455/435.2; 455/434; 455/438; 370/332

(58) Field of Classification Search
USPC .............. 455/434, 7, 11.1, 13.1, 63.1, 67.13, 455/450, 435.2, 436–439; 370/331, 332
See application file for complete search history.

(56) References Cited

U.S. PATENT DOCUMENTS

| | | | |
|---|---|---|---|
| 5,483,669 A * | 1/1996 | Barnett et al. ............... 455/437 |
| 5,499,386 A * | 3/1996 | Karlsson ..................... 455/444 |
| 7,031,726 B2 * | 4/2006 | Cheng ........................ 455/456.1 |
| 7,570,951 B2 | 8/2009 | Classon et al. |
| 8,559,948 B2 * | 10/2013 | Chin et al. ................. 455/435.1 |
| 2004/0228304 A1 * | 11/2004 | Riedel et al. ................. 370/332 |
| 2007/0280172 A1 * | 12/2007 | Tan et al. .................... 370/335 |
| 2008/0205370 A1 * | 8/2008 | Bae et al. .................... 370/345 |
| 2009/0304095 A1 | 12/2009 | Chauncey et al. |
| 2010/0027471 A1 | 2/2010 | Palanki et al. |
| 2010/0041409 A1 | 2/2010 | Kim et al. |
| 2010/0069010 A1 | 3/2010 | Karakayali et al. |
| 2011/0211521 A1 * | 9/2011 | Baba et al. ................... 370/315 |
| 2012/0058759 A1 * | 3/2012 | Lundborg et al. ............ 455/424 |

FOREIGN PATENT DOCUMENTS

KP   10-2010-0034677   4/2010

* cited by examiner

*Primary Examiner* — Cong Tran

(74) *Attorney, Agent, or Firm* — NSIP Law

(57) ABSTRACT

Provided is a cooperative communication technology of a target terminal and a cooperative terminal. In an environment in which interference exists between cells, cooperation between terminals may be performed in order to improve quality of signals that are received from a base station.

34 Claims, 14 Drawing Sheets

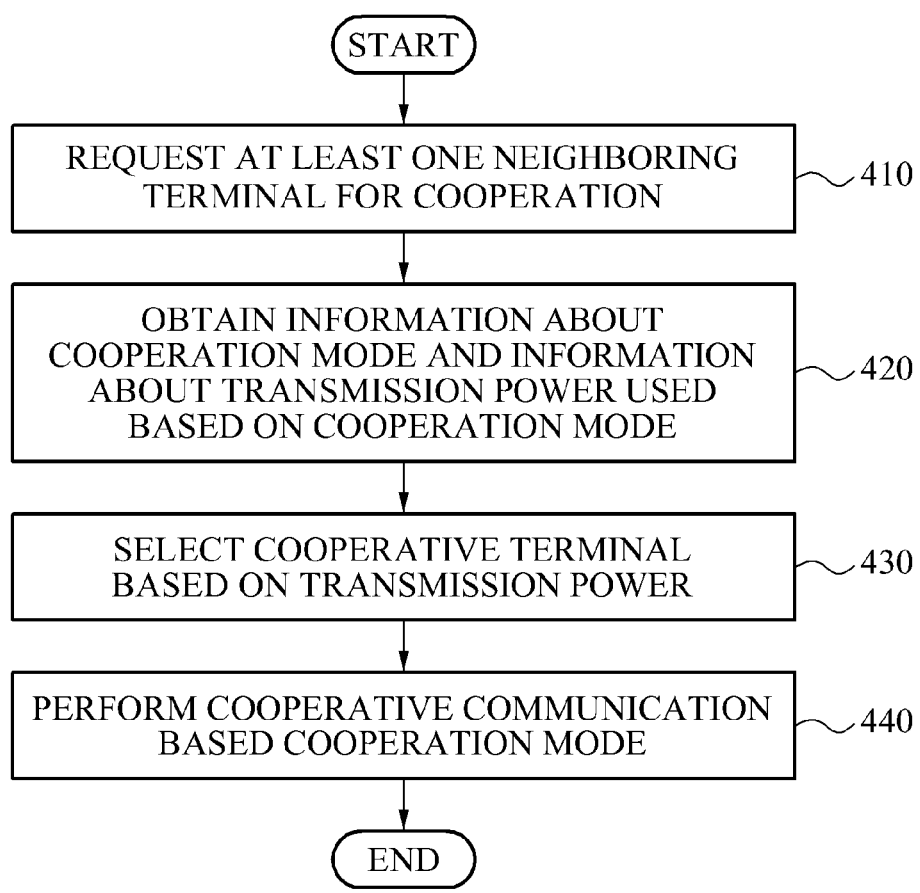

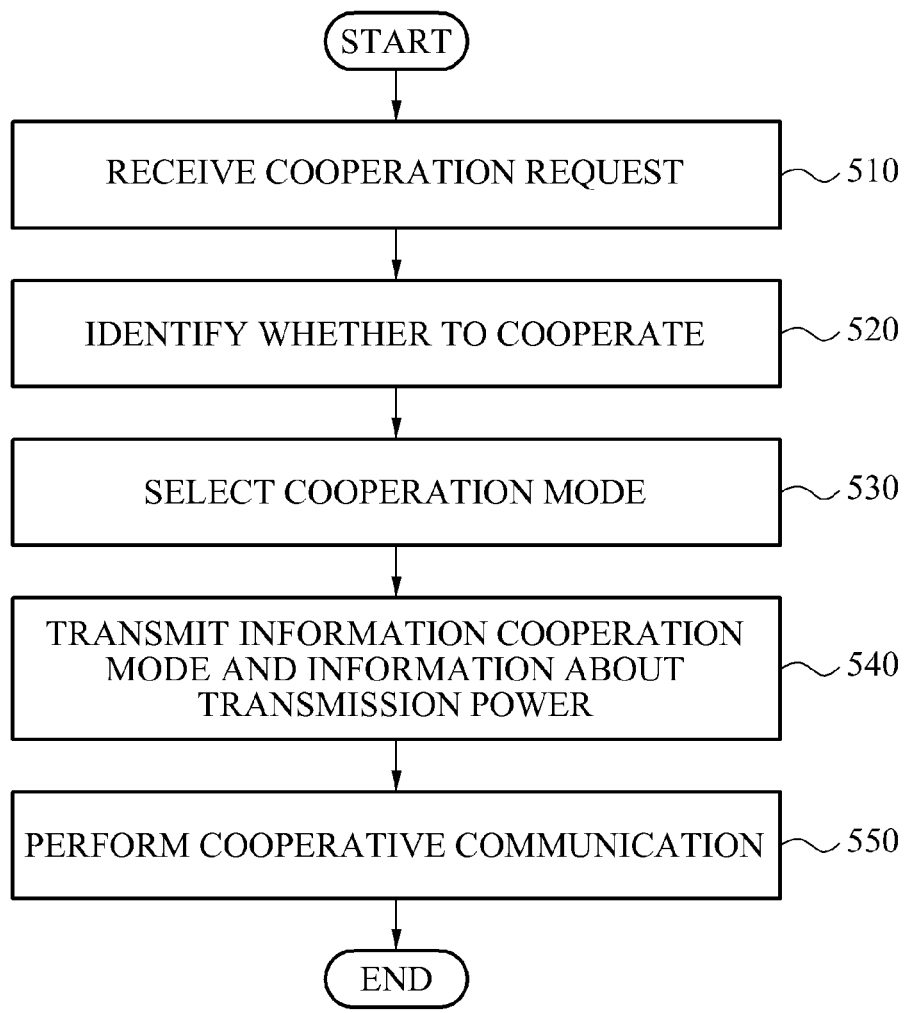

COOPERATIVE COMMUNICATION METHODS AND A DEVICE FOR A TARGET TERMINAL AND A COOPERATIVE TERMINAL

CROSS-REFERENCE TO RELATED APPLICATION(S)

This application claims the benefit under 35 U.S.C. §119 (a) of Korean Patent Application No. 10-2010-0121522, filed on Dec. 1, 2010, in the Korean Intellectual Property Office, the entire disclosure of which is incorporated herein by reference for all purposes.

BACKGROUND

1. Field

The following description relates to a cooperative communication method for a target terminal and a cooperative terminal.

2. Description of Related Art

There is a rapidly increasing demand for transmitting/receiving high-capacity data through super-high speed communication. Accordingly, next-generation wireless communication systems are required to guarantee users a high communication capacity. As more users join mobile a communication service, with a desire to use a variety of services, coverage of one base station may gradually decrease and the base station may function as an interference-limited network. For example, a femto cell is a small wireless access point (AP) that is designed for use in a home or a business. The femto cell has a small coverage area but guarantees a high communication capacity in the small coverage area with a small amount of transmission power.

In a wireless communication system using a femto cell, a femto cell may be installed at any desired time and place to satisfy a demand of the users for high-capacity wireless communication. However, in the femto cell communication system, if a large number of femto cell base stations are installed in a small area, strong interference may occur between femto cells. The interference may cause an interference channel to be formed between the femto cell base stations and the users.

To solve interference issues, various methods have been suggested. For example, a method of additionally using resources through a frequency division, a time division, a code division, and the like have been suggested. However, these methods do not account for high traffic needed for a wireless communication system. Thus, there is a need for a communication method to efficiently resolve the interference issues and to improve communication performance.

SUMMARY

In one general aspect, there is provided a cooperative communication method of a target terminal, the method including requesting at least one neighboring terminal for cooperation based on signal quality between the target terminal and a serving base station of the target terminal, obtaining, from the at least one neighboring terminal, information about a cooperation mode between the target terminal and the at least one neighboring terminal and information about an amount of transmission power to be used by the at least one neighboring terminal, based on the cooperation mode, selecting a cooperative terminal to cooperate with the target terminal from among the at least one neighboring terminal based on the information, and performing cooperative communication with the cooperative terminal based on a cooperation mode corresponding to the cooperative terminal.

The cooperation mode may comprise at least one of an amplify-and-forward (AF) cooperation mode in which the cooperative terminal transmits a signal element for the target terminal, to the target terminal, and a decode-and-forward (DF) cooperation mode in which the cooperative terminal transmits a signal element for the cooperative terminal that acts as interference on the target terminal, to the target terminal.

The method may further comprise calculating a difference between preset target signal quality and the signal quality between the target terminal and the serving base station of the target terminal in each of the AF cooperation mode and the DF cooperation mode, wherein the requesting of the at least one neighboring terminal for cooperation comprises broadcasting a message including at least one of information about the difference in signal quality in each of the AF cooperation mode and the DF cooperation mode, an address of the target terminal, an identification (ID) of the serving base station of the target terminal, and an ID of a base station of the at least one neighboring terminal.

The selecting of the cooperative terminal to cooperate with the target terminal may select the cooperative terminal to cooperate with the target terminal based on the amount of transmission power to be used by the at least one neighboring terminal.

The method may further comprise transmitting, to the cooperative terminal, a message including information about a channel between the target terminal and the cooperative terminal and information about a start time and a termination time of the cooperative communication between the target terminal and the cooperative terminal.

The method may further comprise transmitting, to the cooperative terminal, a message including a beam-forming vector of the target terminal and noise power of the target terminal, in response to the cooperation mode being an AF cooperation mode in which the cooperative terminal transmits a signal element for the target terminal, to the target terminal.

The method may further comprise calculating a linear combination coefficient to improve the signal quality of the target terminal using the signal element for the target terminal, information about an interference channel between the cooperative terminal and the serving base station of the target terminal, and a transmission power ratio of the cooperative terminal with respect to the signal element for the target terminal.

The method may further comprise linear-signal-combining the signal element for the target terminal with a signal received by the target terminal from the serving base station using the linear combination coefficient.

The method may further comprise receiving, from the cooperative terminal, a message including a signal element for the cooperative terminal that acts as interference on the target terminal, information about a channel between the cooperative terminal and the target terminal, and information about an amount of transmission power of the cooperative terminal, in response to the cooperation mode being a DF cooperation mode.

The method may further comprise removing interference of the target terminal using the signal element for the cooperative terminal.

The removing of the interference of the target terminal may remove the interference by linearly-combining the signal element for the cooperative terminal.

The removing of the interference of the target terminal may further comprise adjusting the signal quality of the target terminal based on transmission power with respect to the signal element for the cooperative terminal and a linear combination coefficient used for the linear combination.

The removing of the interference of the target terminal may comprise re-combining an interference element with respect a channel between a base station of the cooperative terminal and the target terminal using information about the channel between the base station of the cooperative terminal and the target terminal and a beam-forming vector of the cooperative terminal, and removing the recombinant interference element from a signal received by the target terminal to improve the signal quality of the target terminal.

In another aspect, there is provided a cooperative communication method of a cooperative terminal, the method including receiving a cooperation request from a target terminal, identifying whether to cooperate with the target terminal, in response to the cooperation request, selecting a cooperation mode between the target terminal and the cooperative terminal, transmitting, to the target terminal, information about the cooperation mode and information about an amount of transmission power to be used by the cooperative terminal, based on the cooperation mode, and performing Cooperative communication with the target terminal based on the cooperation mode.

The cooperation mode may comprise at least one of an amplify-and-forward (AF) cooperation mode in which the cooperative terminal transmits a signal element for the target terminal, to the target terminal, and a decode-and-forward (DF) cooperation mode in which the cooperative terminal transmits a signal element for the cooperative terminal that acts as interference on the target terminal, to the target terminal.

The receiving of the cooperation request may comprise receiving a message including at least one of information about a difference between preset target signal quality and signal quality between the target terminal and a serving base station in each of the AF cooperation mode and the DF cooperation mode, an address of the target terminal, an identification (ID) of the serving base station of the target terminal, and an ID of a base station of the cooperative terminal.

The identifying of whether to cooperate with the target terminal may comprise comparing preset target signal quality with signal quality between the cooperative terminal and a base station of the cooperative terminal.

The method may further comprise measuring an interference-to-noise ratio (INR) with respect to a channel between the cooperative terminal and the serving base station of the target terminal based on a pilot signal that is received from the serving base station of the target terminal.

The selecting of the cooperation mode between the target terminal and the cooperative terminal may comprise selecting the cooperation mode between the target terminal and the cooperative terminal based on the INR and the difference between the preset target signal quality and the signal quality between the target terminal and the serving base station of the target terminal in each of the AF cooperation mode and the DF cooperation mode, and determining the transmission power to be used by the cooperative terminal in each of the AF cooperation mode and the DF cooperation mode.

The selecting of the cooperation mode between the target terminal and the cooperative terminal may comprise selecting a mode in which the transmission power to be used by the cooperative terminal is less consumed among the AF cooperation mode and the DF cooperation mode.

The method may further comprise receiving, from the target terminal, information including a beam-forming vector of the target terminal and noise power of the target terminal, in response to the cooperation mode being the AF cooperation mode.

The identifying of whether to cooperate with the target terminal may comprise calculating a signal quality gain to be obtained by the target terminal using the beam-forming vector of the target terminal and the noise power of the target terminal, and identifying whether to cooperate with the target terminal based on a result of the calculation.

The method may further comprise transmitting, to the target terminal, a signal element for the target terminal, information about an interference channel between the cooperative terminal and a serving base station of the target terminal, and information about a transmission power ratio of the cooperative terminal with respect to the signal element for the target terminal.

The method may further comprise transmitting, to the target terminal, a message including a signal element for the cooperative terminal that acts as interference on the target terminal, information about a channel between the cooperative terminal and the target terminal, and information about the amount of transmission power of the cooperative terminal, in response to the cooperation mode being a DF cooperation mode.

In another aspect, there is provided a computer-readable storage medium comprising program instructions to cause a processor to implement a method including requesting at least one neighboring terminal for cooperation based on signal quality between the target terminal and a serving base station of the target terminal, obtaining, from the at least one neighboring terminal, information about a cooperation mode between the target terminal and the at least one neighboring terminal and information about an amount of transmission power to be used by the at least one neighboring terminal, based on the cooperation mode, selecting a cooperative terminal to cooperate with the target terminal from among the at least one neighboring terminal based on the information, and performing cooperative communication with the cooperative terminal based on a cooperation mode corresponding to the cooperative terminal.

In another aspect, there is provided a target terminal in a cooperative communication environment that receives a signal from a base station that serves the target terminal, the target terminal including a transmitter configured to transmit a request for cooperation to one or more neighboring terminals, a receiver configured to receive cooperation information from the one or more neighboring terminals, and a selector configured to select a neighboring terminal from the one or more neighboring terminals as a cooperative terminal, based on the cooperation information received from the one or more neighboring terminals.

The signal data may comprise a signal transmitted from the base station to the target terminal that was received by the cooperative terminal, and the signal data may be amplified by the cooperative terminal.

The signal data may comprise a signal that interferes with a signal transmitted from the base station to the target terminal, and the target terminal may use the interference signal to remove noise from the signal received from the base station.

The target terminal may further comprise a controller configured to determine the signal quality of the signal received from the base station by comparing the signal quality of the signal received from the base station with a preset threshold.

The receiver may receive cooperation information indicating that a plurality of neighboring terminals are available to cooperate, and information about the amount of power to be used by each of the neighboring terminals during cooperation, and the selector selects the cooperative terminal based on the amount of power to be used by each of the neighboring terminals.

The receiver may be further configured to receive signal data from the cooperative terminal to strengthen the signal quality of the signal that is received from the base station.

The signal received from the base station may be received via a cellular network, and cooperation information received from the one or more neighboring terminals may be received via a BLUETOOTH® network or a WLAN.

The selector may determine a cooperation mode from among a plurality of cooperation modes for the cooperative communication based on the cooperation information received from the one or more neighboring terminals.

The plurality of cooperation modes may comprise an amplify-and-forward (AF) cooperation mode in which the cooperative terminal transmits a signal element for the target terminal, to the target terminal, and a decode-and-forward (DF) cooperation mode in which the cooperative terminal transmits a signal element for the cooperative terminal that acts as interference on the target terminal, to the target terminal.

Other features and aspects may be apparent from the following detailed description, the drawings, and the claims.

BRIEF DESCRIPTION OF THE DRAWINGS

FIG. 4 is a flowchart illustrating an example of a cooperative communication method of a target terminal.

FIG. 5 is a flowchart illustrating an example of a cooperative communication method of a cooperative terminal.

Figure 1:
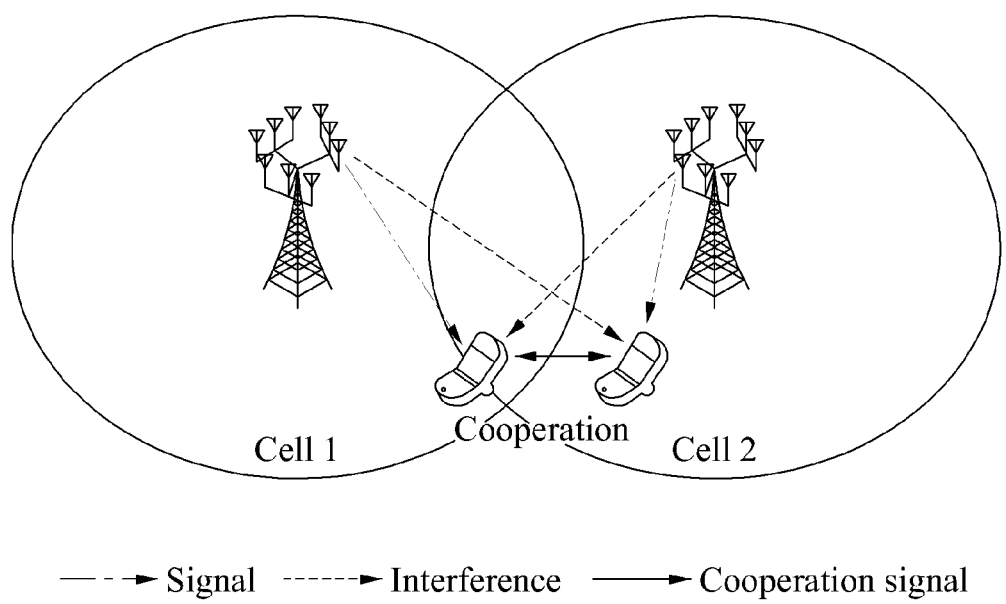
FIG. 1 is a diagram illustrating an example of interference that occurs between cells and cooperation between terminals in a multi-cell environment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

Hereinafter, the term "signal quality" may include a signal to noise ratio (SNR), a signal to interference plus noise ratio (SINR), an interference to noise ratio (INR), and the like, and the term may be used in place of the term "channel quality."

Figure 2:
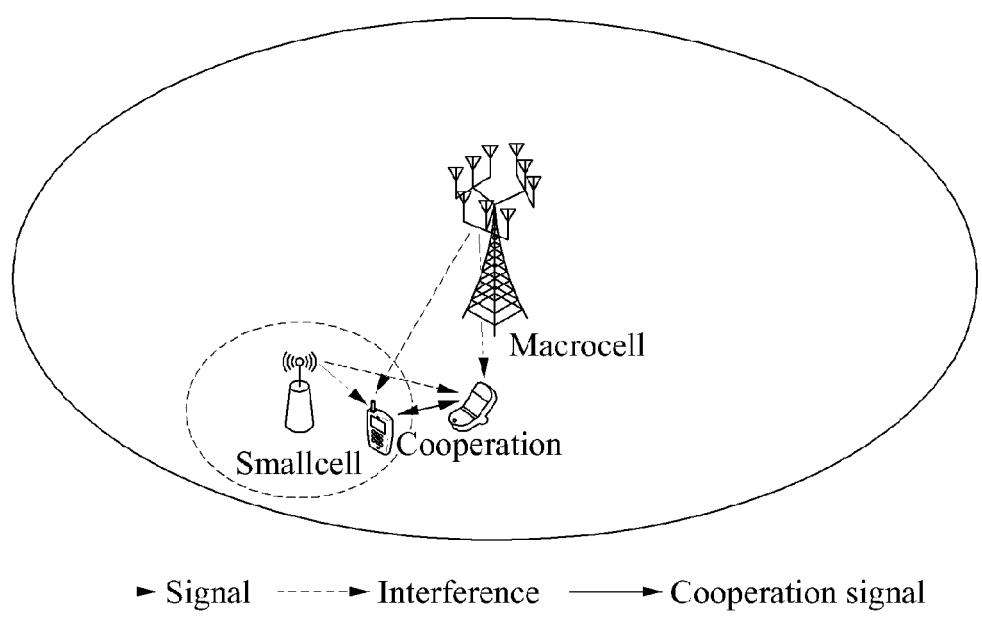
FIG. 2 is a diagram illustrating an example of interference that occurs between cells and cooperation between terminals in a heterogeneous cell environment.

FIG. 1 illustrates an example of interference that occurs between cells and cooperation between terminals in a multi-cell environment, and FIG. 2 illustrates an example of interference that occurs between cells and cooperation between terminals in a heterogeneous cell environment.

In the multi-cell environment of FIG. 1, cells are installed adjacently, such as in a cellular environment. In the heterogeneous cell environment of FIG. 2, a small cell, such as a micro cell, a pico cell, or a femto cell, is installed in a large cell, such as a macro cell.

FIGS. 1 and 2 illustrate examples of how terminals may cooperate with each other under the influence of interference between different cells in each of the multi-cell environment and the heterogeneous cell environment.

Hereinafter, the term "cooperation between terminals" may correspond to two terminals that perform direct communication with each other, for example, using a wireless LAN module or a BLUETOOTH® module installed in the respective terminals, to exchange information to improve signal elements and/or to reduce interference signals.

For example, during the cooperation between terminals the terminals positioned in different cells may communicate directly with each other using a communication scheme, such as Wi-Fi, other than a direct cellular communication scheme. In this example, the cooperation between terminals may reduce interference elements and increase an SINR through exchange of information between the terminals, thereby enhancing a reception rate of the terminals.

A cooperation method between terminals may be classified into two types.

In the first type of cooperation method, a terminal providing help ("cooperative terminal") amplifies and forwards a signal element, for a terminal receiving help ("target terminal"), to the target terminal, which is called an amplify-and-forward (AF) cooperation mode. The AF cooperation mode may also be referred to as a signal forwarding (SF) mode in which the cooperative terminal forwards the signal element of the target terminal.

In the second type of cooperation method, a cooperative terminal decodes a signal element for the cooperative terminal, which is an interference element of the target terminal, and forwards the decoded signal element of the cooperative terminal to the target terminal. The second type is called a decode-and-forward (DF) mode, and may also be referred to as an interference forwarding (IF) mode in which the cooperative terminal forwards the interference element of the target terminal.

Hereinafter, there is described an AF cooperation mode and a DF cooperation mode for cooperative communication between a target terminal and a cooperative terminal in an interference channel environment. Also described is a method for determining a more efficient method from among the AF cooperation mode and the DF cooperation mode.

To determine terminals to perform efficient cooperation, a signal quality value additionally used for cooperation between the terminals and an amount of transmission power consumed by the terminals based on each cooperation mode may be considered.

Figure 3:
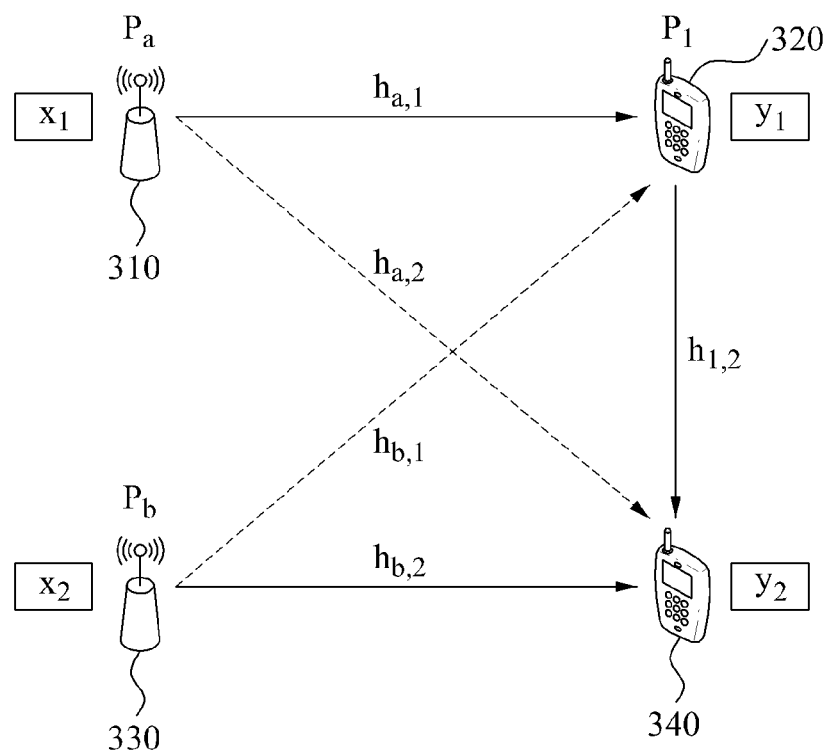
FIG. 3 is a diagram illustrating an example of cooperation that is performed between terminals in an interference channel environment.

FIG. 3 illustrates an example of cooperation that is performed between terminals in an interference channel environment.

Referring to the interference channel environment of FIG. 3, base station a 310 and base station b 330 exist at a transmission terminal, and terminal 1 320 and a terminal 2 340 exist at a reception terminal. In this example, the terminal 1 320 is referred to as a terminal providing help, "cooperative terminal," and the terminal 2 340 is referred to as a terminal receiving help, "target terminal."

The base station a 310 transmits a signal to the cooperative terminal 320 that is served by the base station a 310 using an amount of power $P_a$, and the base station b 330 transmits a signal to the target terminal 340 that is served by the base station b 330 using an amount of power $P_b$. The signal transmitted by the base station a 310 is referred to as $x_1$, and a signal received by the cooperative terminal 320 is referred to as $y_1$. Also, the signal transmitted by the base station b 330 is referred to as $x_2$, and a signal received by the target terminal 340 is referred to as $y_2$.

In the example of FIG. 3, h denotes a channel of each link, wherein $h_{i,j}$ denotes a channel from a node i to a node j. In addition, $h_{a,2}$ denotes a channel through which the base station a 310 interferes with the target terminal 340, and $h_{b,1}$ denotes a channel through which the base station b 320 interferes with the cooperative terminal 320. Further, $h_{1,2}$ denotes a channel through which the cooperative terminal 320 transmits a signal for cooperation to the target terminal 340, which is referred to as a "cooperation channel."

The cooperative terminal 320 may transmit a signal that is helpful to the target terminal 340 using an amount of power $P_1$ for cooperation between the terminals. If there is no cooperation between the terminals, the cooperative terminal 320 and the target terminal 340 may not satisfy a target SINR.

On the other hand, if cooperation between the terminals is possible a SINR may be increased to satisfy a required amount. For example, the cooperative terminal 320 that satisfies the target SINR may transmit data to the target terminal 340 that does not satisfy the target SINR, to improve signal quality. In this example, a channel or a link between the cooperative terminal 320 and the target terminal 340 may use a different frequency resource from a frequency resource that is used for communication between the base stations 310 and 330 and the terminal 320 and 340 respectively served by the base stations 310 and 330. By using different frequency resources, the communication between the base stations and the terminals, and communication between the terminals does not interfere with each other.

<Transmission Mode of Cooperation Between Terminals>

The cooperative terminal 320 may transmit a cooperation signal that is based on two cooperation modes to improve signal quality of the target terminal 340. The two cooperation modes are the AF mode and the DF mode.

First, the AF cooperation mode is a scheme in which the cooperative terminal 320 amplifies and forwards a signal element from among received signals to the target terminal 340. That is, the cooperative terminal 320 first decodes the signal $x_1$ of the cooperative terminal 320 from among the received signals and forwards the remaining signal elements $y_1-x_1$ other than the signal $x_1$ to the target terminal 340. In this example, the remaining signal elements $y_1-x_1$ correspond to signal elements that are destined for the target terminal 340 but are received by the cooperative terminal 320.

Second, the DF cooperation scheme is a mode in which the cooperative terminal 320 decodes a signal element, for the cooperative terminal 320, from among received signals and forwards the decoded signal element which is an interference element of the target terminal 340, to the target terminal 340. That is, the cooperative terminal 320 decodes the signal $x_1$, destined for the cooperative terminal 320, from among the received signals and forwards the signal $x_1$ to the target terminal 340. Then, the target terminal 340 may extract the signal $x_1$ of the cooperative terminal 320, which is an interference signal, from among received signals, for example, based on a successive interference cancellation (SIC) scheme and may decode the remaining signal $x_2$ of the target terminal 340.

In response to the serving base station a 310 of the cooperative terminal 320 may transmitting the signal $x_1$, and the serving base station b 330 of the target terminal 340 transmitted the signal $x_2$, the signal $y_1$ received by the cooperative terminal 320 and the signal $y_2$ received by the target terminal 340 may be expressed by the following Equations 1 and 2, respectively.

$$y_1 = h_{a,1}\vec{\sqrt{P_a}} \cdot x_1 + h_{b,1}\vec{\sqrt{P_b}} \cdot x_2 + n_1 \quad \text{[Equation 1]}$$

In Equation 1, $h_{a,1}$ denotes a channel from the base station a 310 to the cooperative terminal 320, and $h_{b,1}$ denotes a channel from the base station b 330 to the cooperative terminal 320. Also, $n_1$ denotes white noise with respect to a signal received by the cooperative terminal 320.

$$y_2 = h_{a,2}\vec{\sqrt{P_a}} \cdot x_1 + h_{b,2}\vec{\sqrt{P_b}} \cdot x_2 + n_2 \quad \text{[Equation 2]}$$

In Equation 2, $h_{a,2}$ denotes a channel from the base station a 310 to the target terminal 340, and $h_{b,2}$ denotes a channel from the base station b 330 to the target terminal 340. Also, $n_2$ denotes white noise with respect to a signal received by the target terminal 340.

<Calculation of Signal Quality (SINR) in AF Cooperation Mode>

In the AF cooperation mode, the cooperative terminal 320 and the target terminal 340 each have a signal quality, for example, an SINR. The signal quality may be calculated by the following equations. In the AF cooperation mode, because the remaining signal elements $y_1-x_1$ after the signal $x_1$ is decoded in Equation 1 are transmitted, a signal $v_2$ received by the target terminal 340 from the cooperative terminal 320 may be expressed by Equation 3.

$$v_2 = h_{1,2}\beta(h_{b,1}\vec{\sqrt{P_b}} \cdot x_2 + n_1) + n_2 \quad \text{[Equation 3]}$$

In Equation 3, $$|\beta|^2 = \frac{P_1}{|h_{b,1}|^2 P_b + N_0} \text{ and}$$

$$\tilde{x}_2 = h_{b,1}\sqrt{P_b} \cdot x_2 + n_1.$$

Further, $N_0$ denotes white noise with respect to the signal $v_2$ received by the target terminal 340 from the cooperative terminal 320.

The signal $x_1$ of the cooperative terminal 320 that is received from the base station a 310 has an SINR $\Gamma_{y1}(x_1)$, that may be expressed by Equation 4.

$$\Gamma_{y1}(x_1) = \frac{|h_{a,1}|^2 P_a}{|h_{b,1}|^2 P_b + N_0} \quad [\text{Equation 4}]$$

The remaining signals from among the signals received by the cooperative terminal 320, other than $x_1$, may be expressed by $y_1^c = h_{b,1}\vec{\sqrt{P_b}} \cdot x_2 + n_1$. Thus, an SINR $\gamma_{y_1^c}(x_2)$ of $x_2$ in $y_1^c$ may be expressed by Equation 5.

$$\gamma_{y_1^c}(x_2) = \frac{|h_{b,1}|^2 P_b}{N_0} \quad [\text{Equation 5}]$$

Further, an SINR $\gamma_{v_2}(\hat{x}_2)$ of $x_2$ from among signals received by the target terminal 340, from the cooperative terminal 320, through the cooperation channel $h_{1,2}$ may be expressed by Equation 6.

$$\gamma_{v_2}(\tilde{x}_2) = \frac{|h_{1,2}|^2 P_1}{N_0} \quad [\text{Equation 6}]$$

Further, an SINR $\gamma_{y_2}(x_2)$ of $x_2$, from among signals received by the target terminal 340 from the base station, may be expressed by Equation 7.

$$\gamma_{y_2}(x_2) = \frac{|h_{b,2}|^2 P_b}{|h_{a,2}|^2 P_a + N_0} \quad [\text{Equation 7}]$$

Using the above Equations 5 to 7, a final SINR $\gamma_{d_2}(x_2)$ of $x_2$ received by the target terminal 340 may be expressed by Equation 8.

$$\gamma_{d_2}(x_2) = \gamma_{y_2}(x_2) + \frac{\gamma_{y_1^c}(x_2) \cdot \gamma_{v_2}(\tilde{x}_2)}{\gamma_{y_1^c}(x_2) + \gamma_{v_2}(\tilde{x}_2) + 1} \quad [\text{Equation 8}]$$

$$= \frac{|h_{b,2}|^2 P_b}{|h_{a,2}|^2 P_a + N_0} + \frac{|h_{b,1}|^2 P_b \cdot |h_{1,2}|^2 P_1}{(|h_{b,1}|^2 P_b + |h_{1,2}|^2 P_1 + N_0) N_0}$$

In this example, the final SINR $\gamma_{d_2}(x_2)$ of $x_2$ may be expressed by a sum of an SINR of a direct link and an SINR of a relay link.

<Calculation of Signal Quality (SINR) in DF Cooperation Mode>

Likewise in the AF cooperation mode and in the DF cooperation mode, each terminal may have signal quality, for example, an SINR. The signal quality may be calculated by the following equations. In the DF cooperation mode, because the signal $x_1$ is transmitted after $x_1$ is decoded from $y_1$ of Equation 1, a signal $u_2$ received by the target terminal 340 from the cooperative terminal 320 may be expressed by the following Equation 9.

$$u_2 = h_{1,2}\vec{\sqrt{P_1}} \cdot x_1 + n_2 \quad [\text{Equation 9}]$$

An SINR $\Gamma_{y2}(x_1)$ of the signal $x_1$, from among the signals received by the target terminal 340 from the base station, may be expressed by Equation 10.

$$\Gamma_{y2}(x_1) = \frac{|h_{a,2}|^2 P_a}{|h_{b,2}|^2 P_b + N_0} \quad [\text{Equation 10}]$$

Further, an SINR $\Gamma_{u2}(x_1)$ of the signal $x_1$, from among the signals received by the target terminal 340 from the cooperative terminal 320, may be expressed by Equation 11.

$$\Gamma_{u_2}(x_1) = \frac{|h_{1,2}|^2 P_1}{N_0} \quad [\text{Equation 11}]$$

Thus, a final SINR $\Gamma_{d2}(x_1)$ of the signal $x_1$, of the target terminal 340, may be expressed by Equation 12.

$$\Gamma_{d_2}(x_1) = \min\{\Gamma_{y1}(x_1); \Gamma_{y2}(x_1) + \Gamma_{u2}(x_1)\} \quad [\text{Equation 12}]$$

In this example, the final SINR $\Gamma_{d2}(x_1)$ of the signal $x_1$, of the target terminal 340, is limited by a minimum value from among the SINR $\Gamma_{y1}(x_1)$ of the signal $x_1$ of the cooperative terminal 320 that is received from the base station a 310, expressed by Equation 4, and a sum $\Gamma_{y2}(x_1) + \Gamma_{u2}(x_1)$ of the two SINRs that are respectively expressed by Equation 10 and Equation 11.

The target terminal 340 first decodes the signal $x_1$, based on the SINR of the signal $x_1$ that is received from the cooperative terminal 320, eliminates the signal $x_1$ from the signal $y_2$, and decodes the signal $x_2$ of the target terminal 340. In this example, because the target terminal 340 first subtracts the signal $x_1$, which is an interference element of the target terminal 340, from the signal $y_2$, a final SINR $\Gamma_{d_2^c}(x_2)$ of the signal $x_2$ of the target terminal 340 may be expressed by Equation 13. Accordingly, the target terminal may perform interference cancellation or reduction.

$$\Gamma_{d_2^c}(x_2) = \frac{|h_{b,2}|^2 P_b}{N_0} \quad [\text{Equation 13}]$$

As described above, in Equation 13, the interference element may be reduced or eliminated, and thus a signal quality gain may be obtained in the DF cooperation mode.

In various examples, the SNIR of the signal $x_1$, of the cooperative terminal 320 and the SINR of the signal $x_2$ of the target terminal 340, which are expressed by Equations 4, 8, and 13, may be greater than a preset value, for example, a target SINR.

Hereinafter, a method of selecting a cooperation mode from among the AF cooperation mode and the DF cooperation mode and a method of determining a minimum transmission power to be used by a cooperative terminal based on each cooperation mode are described.

<Method of Selecting Cooperation Mode Among AF or DF>

First, there is an assumption that the cooperative terminal 320 is a terminal that has a high signal strength that satisfies a target SINR. In this example, the cooperative terminal 320 may identify whether the AF cooperation mode consumes less power or the DF cooperation mode consumes less power and may select a cooperation mode that uses less power consumption.

In the AF cooperation mode, after cooperative communication, an SINR of a signal $x_2$, of the target terminal 340 receiving help may be expressed by Equation 14 if the aforementioned Equation 8 satisfies a target SINR $\gamma_0$.

The SINR of the signal $x_2$, of the target terminal 340, satisfying the above condition may be expressed by the following Equation 14 and Equation 15.

$$\gamma_{y_2}(x_2) + \frac{\gamma_{y_1^c}(x_2) \cdot \gamma_{v_2}(\tilde{x}_2)}{\gamma_{y_1^c}(x_2) + \gamma_{v_2}(\tilde{x}_2) + 1} \geq \gamma_0 \qquad \text{[Equation 14]}$$

$$\frac{\gamma_{y_1^c}(x_2) \cdot \gamma_{v_2}(\tilde{x}_2)}{\gamma_{y_1^c}(x_2) + \gamma_{v_2}(\tilde{x}_2) + 1} \geq \gamma_0 - \gamma_{y_2}(x_2) \qquad \text{[Equation 15]}$$

An SINR $\gamma_\delta$ that is additionally needed for the signal $x_2$, of the target terminal 340, to satisfy the target SINR may be expressed by Equation 16.

$$\gamma_0 - \gamma_{y2}(x_2) = \gamma_\delta \qquad \text{[Equation 16]}$$

In this example, a difference between an SINR between the target terminal 340 and the serving base station 330 of the target terminal 340, and the target SINR may be expressed by $\gamma_\delta$.

In addition, the above Expression 16 may be further expressed by Equation 17.

$$\frac{|h_{b,1}|^2 P_b \cdot |h_{1,2}|^2 P_1}{(|h_{b,1}|^2 P_b + |h_{1,2}|^2 P_1 + N_0) N_0} = \gamma_\delta \qquad \text{[Equation 17]}$$

From Equation 17, a transmission power of the cooperative terminal 320 may be expressed by Equation 18.

$$P_1 = \frac{N_0}{|h_{1,2}|^2} \cdot \gamma_\delta \cdot \frac{|h_{b,1}|^2 P_b + N_0}{|h_{b,1}|^2 P_b - \gamma_\delta N_0} \qquad \text{[Equation 18]}$$

Finally, an amount of transmission power $P_1$, that is used by the cooperative terminal 320, may be expressed by Equation 19.

$$P_1 = \frac{N_0}{|h_{1,2}|^2} \cdot \gamma_\delta \cdot \frac{S_{b,1} + 1}{S_{b,1} - \gamma_\delta} \qquad \text{[Equation 19]}$$

In the DF cooperation mode, after cooperation, an SINR of signal $x_1$ of the cooperative terminal 320 in the target terminal 340 may be expressed by the Equation 12.

$$\Gamma_{d_2}(x_1) = \min\{\Gamma_{y1}(x_1), \Gamma_{y2}(x_1) + \Gamma_{u2}(x_1)\} \qquad \text{[Equation 12]}$$

In this example, provided that the cooperative terminal 320 already satisfies a target SINR, Equation 12 is determined by a right term. Thus, in order for the cooperative terminal 320 to satisfy the target SINR $\gamma_0$, the following Equation 20 may be satisfied.

$$\Gamma_{y2}(x_1) + \Gamma_{u2}(x_1) \geq \gamma_0 \qquad \text{[Equation 20]}$$

Similar to the AF cooperation mode, a difference $\Gamma_\delta$ between the target SINR $\gamma_0$ and the SINR $\Gamma_{y2}(x_1)$ of the signal $x_1$, from among signals received by the target terminal 340 from the base station, may be expressed by the following Equation 21. In this example, the difference $\Gamma_\delta$ between the SINRs is the same as an SINR $\Gamma_{u2}(x_1)$ of a signal $x_1$, from among signals received by the target terminal 340 from the cooperative terminal 320 through a cooperation channel.

$$\Gamma_{u2}(x_1) = \gamma_0 - \Gamma_{y2}(x_1) = \Gamma_\delta \qquad \text{[Equation 21]}$$

Through Equation 21, an amount of power $P_1$ to be transmitted by the cooperative terminal 320 may be calculated by Equation 22.

$$P_1 = \frac{N_0}{|h_{1,2}|^2} \cdot \Gamma_\delta \qquad \text{[Equation 22]}$$

Thus, in each of the AF cooperation mode or the DF cooperation mode which are obtained through Equation 19 and Equation 22, respectively, a minimum amount of transmission power to be used by the cooperative terminal 320 is expressed by Equation 23.

$$P_1^{AF} = \frac{N_0}{|h_{1,2}|^2} \cdot \gamma_\delta \cdot \frac{S_{b,1} + 1}{S_{b,1} - \gamma_\delta} \qquad \text{[Equation 23]}$$

$$P_1^{DF} = \frac{N_0}{|h_{1,2}|^2} \cdot \Gamma_\delta$$

The cooperative terminal 320 may compare the two amounts of power above and select a mode that requires less power for cooperation. For example, the cooperative terminal 320 may determine the AF cooperation mode for cooperation between terminals as is expressed by Equation 24.

$$P_1^{AF} < P_1^{DF} \qquad \text{[Equation 24]}$$

$$\gamma_\delta \cdot \frac{S_{b,1} + 1}{S_{b,1} - \gamma_\delta} < \Gamma_\delta$$

As another example, the cooperative terminal 320 may determine the DF cooperation mode for cooperation between terminals as is expressed by Equation 25.

$$P_1^{AF} \geq P_1^{DF} \qquad \text{[Equation 25]}$$

$$\gamma_\delta \cdot \frac{S_{b,1} + 1}{S_{b,1} - \gamma_\delta} \geq \Gamma_\delta.$$

In the AF cooperation mode, an SINR $\gamma_\delta$ may be additionally needed for the target terminal 340 to satisfy the target SINR. For example, a difference between the preset target SINR and an SINR between the target terminal 340 and the serving base station of the target terminal 340, may be calculated using Equation 16.

Further, in the DF cooperation mode, an SINR $\Gamma_\delta$ that is additionally needed for the target terminal 340 to satisfy the target SINR may be calculated by Equation 21.

For example, the additional SINRs $\gamma_\delta$ and $\Gamma_\delta$ have values that are obtained by respectively subtracting an SINR of a signal $x_2$ of the target terminal 340 and an SINR of the interference signal $x_1$ from among signals $y_2$ received by the target terminal 340 from the target SINR $\gamma_0$. In this example, the two SINRs $\gamma_\delta$ and $\Gamma_\delta$ are values that are measured using a pilot signal, while the target terminal 340 receives signals and interference signals of the target terminal 340.

Further, $S_{b,1}$ defined in Equation 19 is an SINR of an interference signal with the cooperative terminal 320. In this example, $S_{b,1}$ may be measured using a pilot signal while the cooperative terminal 320 receives the interference signal. The cooperative terminal 320 may determine whether to use the AF cooperation mode or the DF cooperation mode for cooperative communication using Equation 24 and/or Equation 25 formed of the three parameters $S_{b,1}$, $\gamma_\delta$, and $\Gamma_\delta$.

Further, the amount of transmission power $P_1$ of the cooperative terminal 320 to be used, based on a cooperation mode determined by the cooperative terminal 320, may be determined by Equation 23. In this example, a parameter that is additionally needed to determine the amount of transmission power $P_1$ is only a $h_{1,2}$ value. The $h_{1,2}$ is a value of the channel $h_{1,2}$ between the cooperative terminal 320 and the target terminal 340. The channel value $h_{1,2}$ may be estimated using a pilot signal that is transmitted between the cooperative terminal 320 and the target terminal 340.

Hereinafter, an example of a communication method and operation processes of a cooperative terminal and a target terminal are further described.

FIG. 4 illustrates an example of a cooperative communication method of a target terminal.

Referring to FIG. 4, the target terminal requests at least one neighboring terminal for cooperation based on a signal quality between the target terminal and a serving base station of the target terminal, in 410.

The target terminal obtains, from the at least one neighboring terminal, information about a cooperation mode between the target terminal and the at least one neighboring terminal and information about transmission power that is to be used by the at least one neighboring terminal based on the cooperation mode, in 420.

For example, the cooperation mode may include an AF cooperation mode in which a cooperative terminal transmits a signal element for the target terminal, from among received signals, and a DF cooperation mode in which a cooperative terminal transmits a signal element for the cooperative terminal, from among received signals. In this example, the target terminal may calculate a difference $\gamma_\delta$ and $\Gamma_\delta$ between a preset target signal quality $\gamma_0$ and signal quality that is between the target terminal and the serving base station in each of the AF cooperation mode and the DF cooperation mode.

The target terminal may broadcast a message that includes, for example, at least one of information about the difference $\gamma_\delta$ of signal quality in the AF cooperation mode, the difference $\Gamma_\delta$ of signal quality in the DF cooperation mode, an address of the target terminal, an identification (ID) of the serving base station of the target terminal, and an ID of a base station of the at least one neighboring terminal. The message broadcasted by the target terminal may be referred to as a cooperation request message.

The target terminal selects a cooperative terminal from among the at least one neighboring terminal based on the information about the cooperation mode and the information about transmission power, in 430. For example, the target terminal may select the cooperative terminal based on transmission power to be used by the at least one neighboring terminal. For example, the target terminal may select a terminal that uses a minimum amount of transmission power from among the at least one neighboring terminal.

The target terminal may transmit a message to the cooperative terminal which includes information about a channel $h_{1,2}$ between the target terminal and the cooperative terminal and information about a starting time and a terminating time of cooperative communication between the target terminal and the cooperative terminal. The message may be referred to as a cooperation scheduling information message.

The target terminal performs cooperative communication with the cooperative terminal based on a cooperation mode corresponding to the cooperative terminal, in 440.

Operations of the cooperative communication performed by the target terminal in each of the AF cooperation mode and the DF cooperation mode are further described.

FIG. 5 illustrates an example of a cooperative communication method of a cooperative terminal.

Referring to FIG. 5, the cooperative terminal receives a cooperation request from a target terminal, in 510. The cooperative terminal may identify that the cooperation request is made through a message that is broadcasted by the target terminal, for example, a cooperation request message.

The cooperation request message may include, for example, at least one of information about a difference $\gamma_\delta$ of signal quality in the AF cooperation mode, a difference $\Gamma_\delta$ of signal quality in the DF cooperation mode, an address of the target terminal, an ID of a serving base station, and an ID of a base station of at least one neighboring terminal.

In response to the cooperation request, the cooperative terminal identifies whether cooperation with the target terminal is possible, in 520. For example, the cooperative terminal may determine whether the cooperation with the target terminal is possible by comparing a signal quality between the cooperative terminal and a base station of the cooperative terminal with a preset target signal quality. For example, the cooperative terminal may measure an INR $S_{b,1}$ with respect to a channel between the cooperative terminal and the serving base station based on a pilot signal that is received from the serving base station of the target terminal.

The cooperative terminal selects a cooperation mode between the target terminal and the cooperative terminal, in 530. For example, the cooperative terminal may select the cooperation mode between the target terminal and the cooperative terminal based on the INR $S_{b,1}$ and information about a difference between a preset target signal quality and signal quality between the target terminal and the serving base station in each of the AF cooperation mode and the DF cooperation mode.

For example, the cooperative terminal may select, as the cooperation mode between the target terminal and the cooperative terminal, a cooperation mode in which the cooperative terminal uses a lower amount of transmission power from among the AF cooperation mode and the DF cooperation mode.

Further, the cooperative terminal may determine an amount of transmission power to be used by the cooperative terminal in each of the AF cooperation mode and the DF cooperation mode so that the target terminal may select the cooperative terminal.

A method of the cooperative terminal selecting a cooperation mode may refer to the equations described above with reference to FIG. 3 and the corresponding descriptions.

The cooperative terminal transmits, to the target terminal, information about the cooperation mode and information about the transmission power to be used by the cooperative terminal based on the cooperation mode, in 540. The cooperative terminal performs cooperative communication with the target terminal based on the cooperation mode, in 550.

Figure 6A:
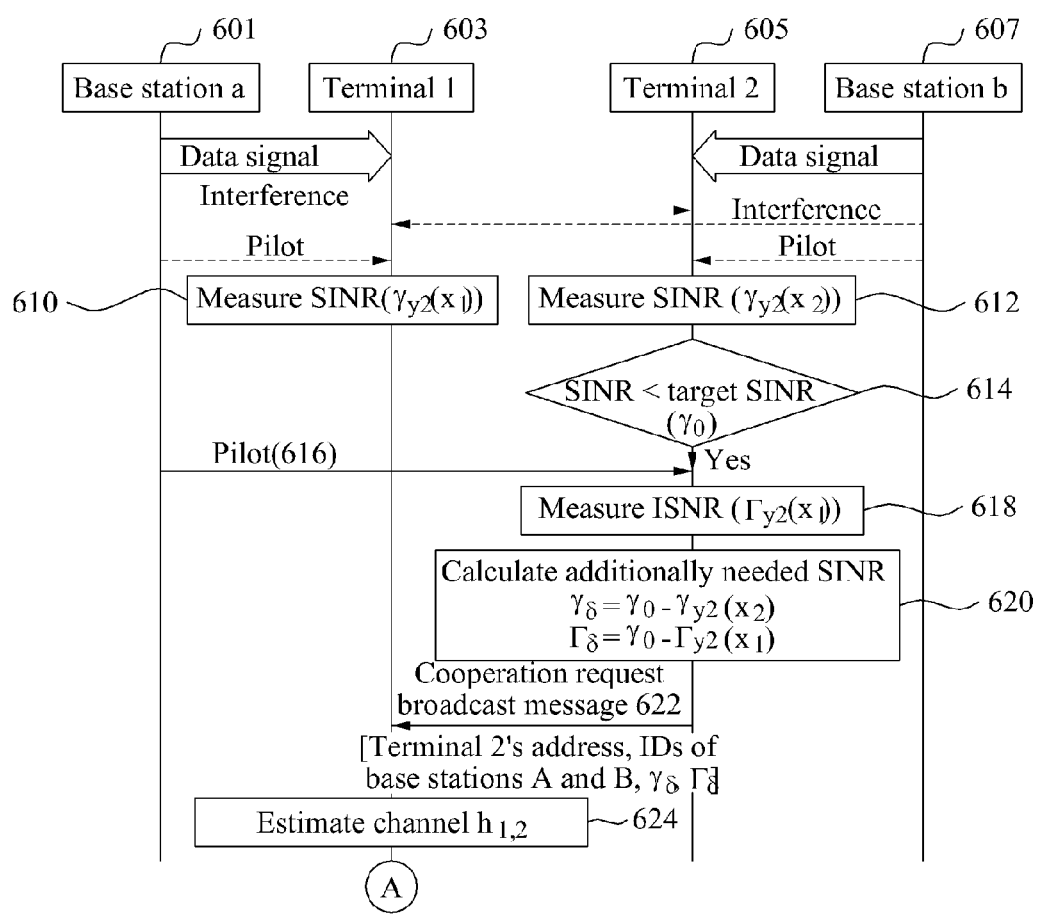
FIG. 6 is a diagram illustrating an example of a cooperative communication process between a target terminal and a cooperative terminal.
Figure 6B:
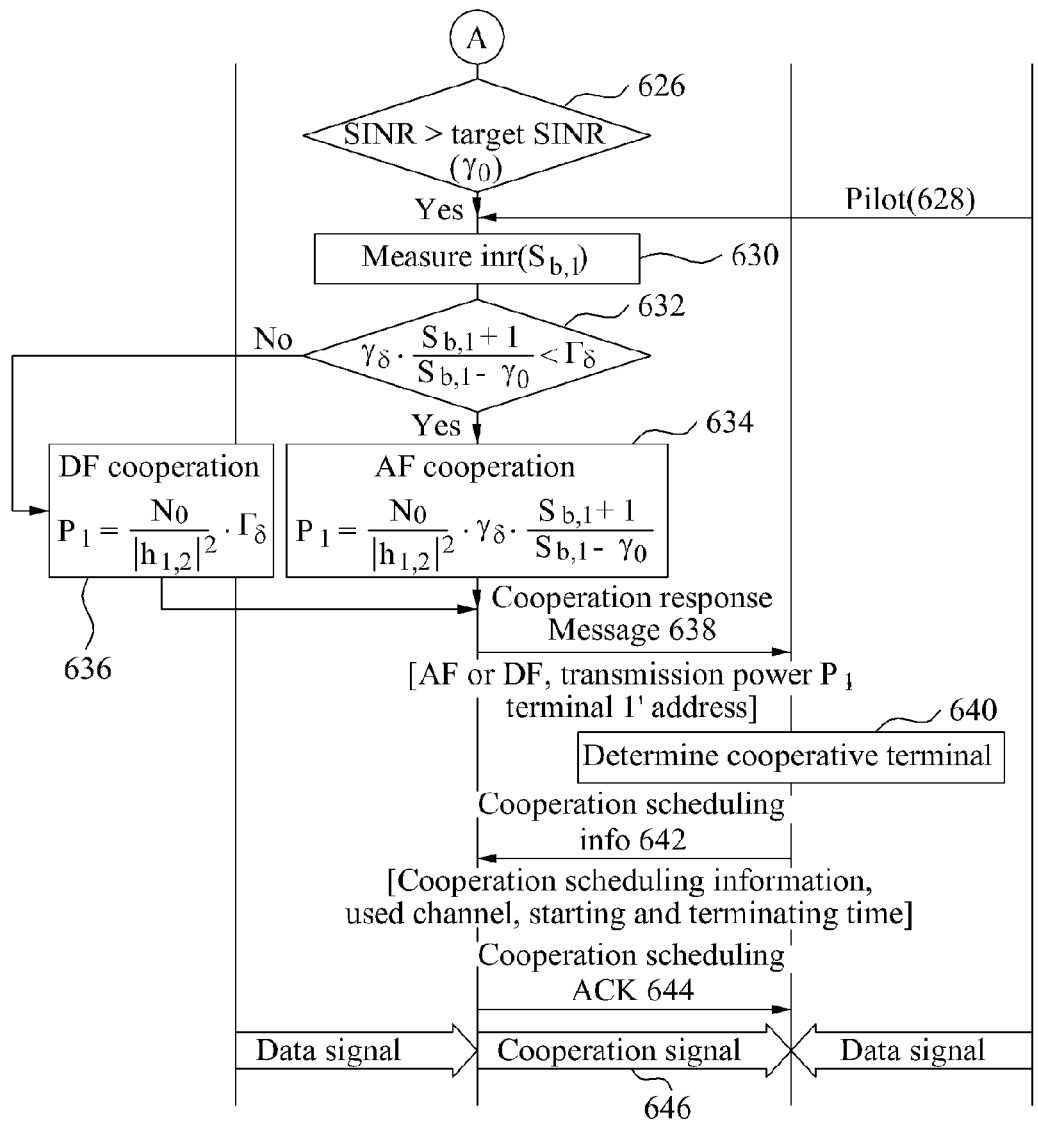

FIG. 6 illustrates an example of a cooperative communication process between a target terminal and a cooperative terminal.

Referring to FIG. 6, a communication system for cooperative communication between the target terminal and the cooperative terminal includes a base station a 601 that serves terminal 1 603, and a serving base station b 607 that serves terminal 2 605. Hereinafter, terminal 1 603 is referred to as a cooperative terminal which provides help, and terminal 2 605 is referred to as a target terminal which receives help.

The base station a 601 transmits an $x_1$ signal to the cooperative terminal 603, and the base station b 607 transmits an $x_2$ signal to the target terminal 605. In this example, the $x_1$ signal transmitted by the base station a 601 to the cooperative terminal 603 interferes with the target terminal 605, and the $x_2$ signal transmitted by the base station b 607 to the target terminal 605 interferes with the cooperative terminal 603.

The target terminal 605 may measure an SINR $\gamma_{y_2}(x_2)$ between the target terminal 605 and the serving base station b 607, based on a pilot signal received from the serving base station b 607 (See Equation 7), in 612.

The cooperative terminal 603 may also receive a pilot signal from the base station a 601 and measure an SINR $\gamma_{y_2}(x_1)$ between the cooperative terminal 603 and the base station a 601, in 610. The SINR measurement operations by the cooperative terminal 603 and by the target terminal 605 may be performed at the same time or one measurement may be performed before the other.

If the SINR $\gamma_{y_2}(x_2)$ between the target terminal 605 and the serving base station b 607 is smaller than a preset target SINR $\gamma_0$, the target terminal 605 evaluates receiving help from the cooperative terminal 603, in 614.

The target terminal 605 measures signal quality using the pilot signal that is transmitted to the target terminal from the base station a 601, in 616, in order to identify an extent of help that the target terminal 605 additionally needed from the cooperative terminal 603 to reach the preset target SINR $\gamma_0$ (See Equation 10), in 618.

In 618, the signal quality measured by the target terminal 605 may be an intrinsic signal to noise ratio (ISNR) of the $x_1$ signal that is an interference signal of the target signal from among the signals received by the target terminal 605.

The target terminal 605 calculates an SINR $\gamma_\delta$ that is additionally needed by the target terminal 605 using the above Equation 16 in the AF cooperation mode, and the target terminal 605 calculates an SINR $\Gamma_\delta$ that is additionally needed by the target terminal 605 using Equation 21 in the DF cooperation mode, in 620.

The target terminal 605 broadcasts a cooperation request message to neighboring terminals including the cooperative terminal 603, for example, using radio access technology (RAT), such as wireless LAN and BLUETOOTH®, in 622. In this example, the cooperation request message may include at least one of information about the difference of SINR $\gamma hd \delta$ in the AF cooperation mode, the difference of SINR $\Gamma_\delta$ in the DF cooperation mode, an address of a terminal requesting cooperation, which is the target terminal 605, an ID of the serving base station b 607 of the target terminal 605, and an ID of the base station a 601 of the cooperative terminal 603.

The neighboring terminals including the cooperative terminal 603 which receive the cooperation request message from the target terminal 605, estimate a direct channel to the target terminal 605, in 624. The direct channel corresponds to a cooperation channel $h_{1,2}$.

The neighboring terminals of the target terminal 605 may determine whether to cooperate based on whether an SINR of the neighboring terminals satisfies the preset target SINR $\gamma_0$. Accordingly, the neighboring terminals receiving the cooperation request message from the target terminal 605 determine whether the SINR of the neighboring terminals is greater than the preset target SINR $\gamma_0$, in 626.

Neighboring terminals or the cooperative terminal 603 which determine to cooperate in 626, measure an INR $S_{b,1}$ of a channel between the cooperative terminal 603 and the serving base station b 607 of the target terminal 605 based on a pilot signal of the base station b 607 using Equation 19 to determine how to perform cooperation, in 630.

The cooperative terminal 603 determines a cooperation mode to use from among the AF cooperation mode and the DF cooperation mode using $\gamma_\delta$, $\Gamma_\delta$, and $S_{b,1}$ based on Equation 24 and Equation 25, in 632. Further, the cooperative terminal 603 calculates the amount of transmission power $P_1$ to use based on the cooperation mode determined by Equation 23, in 634 and 636.

The neighboring terminals and/or the cooperative terminal 603 that determines a cooperation mode, transmits a cooperation response message to the target terminal 605 that requests cooperation, in 638. The cooperation response message may include, for example, at least one of information about the cooperation mode determined by the cooperative terminal 603, for example, the AF cooperation mode or the DF cooperation mode, information about the transmission power $P_1$ to be used by the cooperative terminal 603 based on the cooperation mode, and an address of the cooperative terminal 603.

The target terminal 605 receives the cooperation response message from the neighboring terminals including the cooperative terminal 603 and selects a terminal that has a minimum amount of transmission power as a cooperative terminal, in 640. Accordingly, a minimum amount of power may be used for cooperative communication between the cooperative terminal 603 and the target terminal 605.

The target terminal 605 transmits a cooperation scheduling information message to the determined cooperative terminal 603, in 642. For example, the cooperation scheduling information message may include information about a channel or a wireless resource to be used for cooperative communication between the target terminal and the cooperative terminal. For example, cooperation scheduling information message may include information about a start time and a termination time of the cooperative communication between the target terminal and the cooperative terminal.

The cooperative terminal 603 which receives the cooperation scheduling information message identifies the information included in the message and transmits an acknowledgement message to the target terminal 605, in 644, to prepare for a start of cooperative communication with the target terminal 605.

The cooperative terminal 603 transmits a cooperation signal to the target terminal 605 at the start time of the cooperative communication and performs the cooperative communication, in 646. In this example, a signal element to be transmitted by the cooperative terminal 603 to the target terminal 605 may be different based on the cooperation mode selected by the cooperative terminal 603.

For example, in the AF cooperation mode, the cooperative terminal 603 first decodes an $x_1$ signal of the cooperative terminal 603 from among received signals. Then, the cooperative terminal 603 transmits remaining signal elements $y_1$-$x_1$, excluding the $x_1$ signal, to the target terminal 605 in an SIC scheme.

Accordingly, the target terminal 605 may combine the signal elements $y_1$-$x_1$ from the cooperative terminal 603 with an $x_2$ signal that is received from the base station b 607 to decode the $x_2$ signal that is desired by the target terminal 605.

In the DF cooperation mode, the cooperative terminal 603 decodes an $x_1$ signal of the cooperative terminal 603, which is an interference signal of the target terminal 605, and transmits the decoded $x_1$ signal to the target terminal 605.

The target terminal 605 decodes the $x_1$ signal that is the interference signal element of the target terminal 605 by combining the interference signal received from the base station a 601 with an $x_1$ signal received from the cooperative terminal 603. Then, the target terminal 605 decodes an $x_2$ signal of the target terminal 605, excluding the $x_1$ signal that is the interference signal element, in the SIC scheme.

Further, in the DF cooperation mode, the $x_2$ signal of the target terminal 605 may obtain a final SINR $\Gamma_{d_2^c}(x_2)$ (See Equation 13) to be greater than that of a target SINR $\gamma_0$. For example, the target terminal 605 may report to the base station b 607 about the SINR that is obtained through cooperation with the cooperative terminal 603 so that the base station b 607 may adjust the amount of transmission power $P_1$ or a transmission rate of to the target terminal 605.

Figure 7:
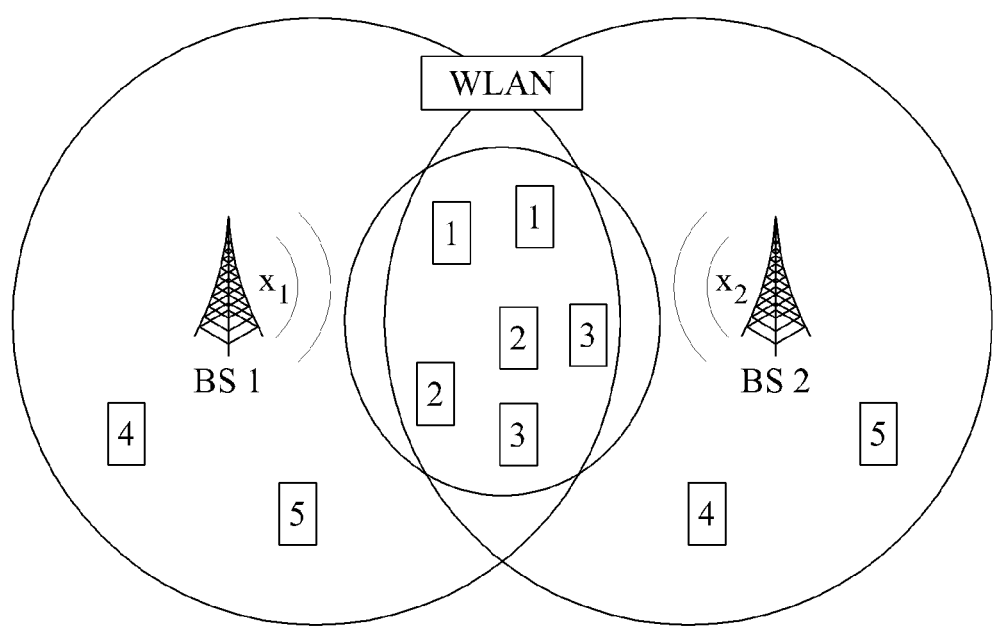
FIG. 7 is a diagram illustrating an example of an environment in which cooperative communication based on an amplify-and-forward (AF) mode is performed.

FIG. 7 illustrates an example of an environment in which cooperative communication based on an AF mode is performed. In FIG. 7, the following conditions are supposed.

The communication system of the example of FIG. 7 is a multiuser multiple input single output (MISO) system, wherein a base station serving each terminal includes multiple antennas, and each terminal includes a single antenna.

In this example, base stations do not perform cooperation for a terminal, and each base station uses a block diagonalization (BD) broadcasting scheme for terminals in a cell of the base station. Further, each terminal is aware of a channel to a base station of a cell in which the terminal is positioned, an interference channel from a neighboring cell, a channel between terminals for cooperative communication, and power and noise power of a received signal.

For example, terminals may be positioned at an edge of a cell, such that neighboring cells overlap with each other, and may communicate with each other through a heterogeneous network, such as WLAN. In this example, a communication environment from a base station in each cell may be improved through cooperative communication between terminals.

For example, if a terminal receives a signal from a base station, and the signal has an SINR smaller than a target SINR, the terminal may request help from other terminals, and a terminal having an SINR greater than the target SINR, for example, a cooperative terminal, may provide help to the terminal, for example, a target terminal, through cooperation.

Figure 8:
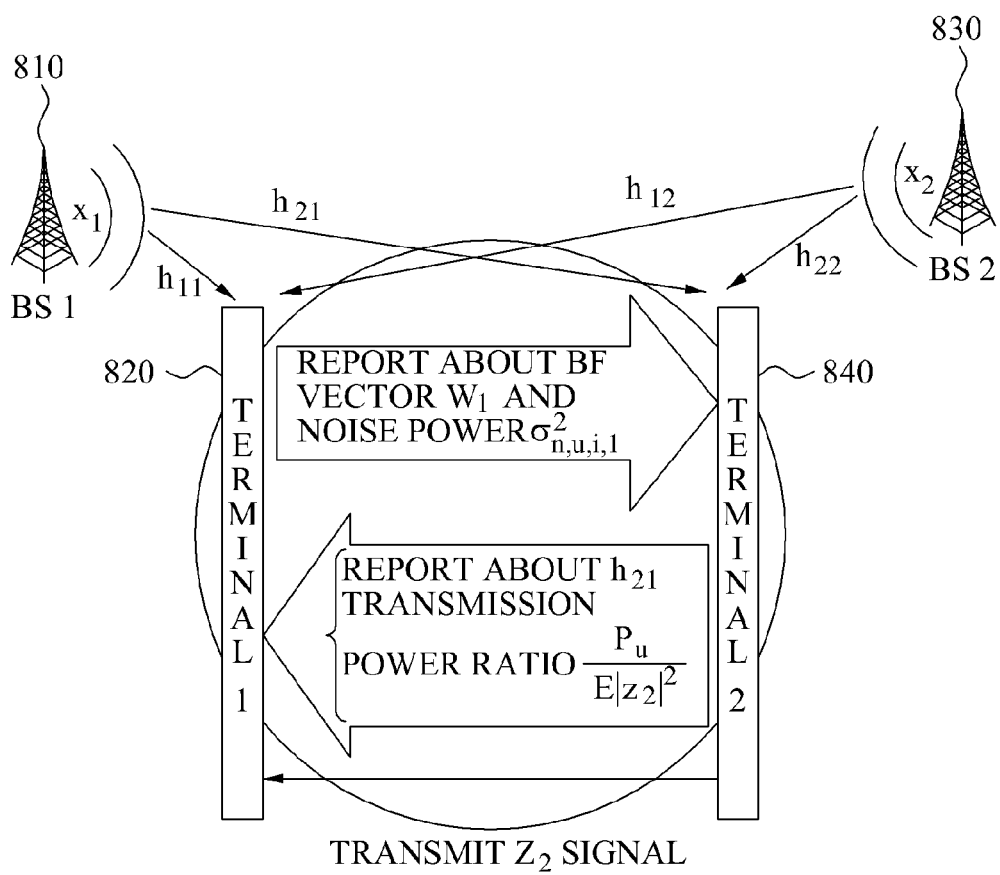
FIG. 8 is a diagram illustrating an example of data that is used for cooperative communication between a target terminal and a cooperative terminal in the environment of FIG. 7.

FIG. 8 illustrates an example of data that is used for cooperative communication between a target terminal and a cooperative terminal in the environment of FIG. 7.

In FIG. 8, a terminal 1 820 which is positioned in a cell of a base station 1 810 and receives help due to an SINR is referred to as a target terminal, and a terminal 2 840 which is positioned in a cell of a base station 2 830 and provides help to the target SINR is referred to as a cooperative terminal.

FIG. 8 shows data to be transmitted for cooperation between terminals.

In the AF cooperation mode in which the cooperative terminal transmits a signal element to the target terminal, the target terminal 1 820 may transmit a message including a beam-forming vector $w_1$ and noise power $\sigma_{n,u,i,1}^2$ allocated to the terminal 1 820 by the base station 1 810, to the cooperative terminal 2 840.

The terminal 2 840 may calculate a signal quality gain in advance to be obtained by the terminal 1 820 through cooperation, using the beam-forming vector and the noise power of the terminal 1 820. In this example, the terminal 2 840 may identify whether to cooperate with the target terminal of the terminal 1 820 based on the signal quality gain.

The terminal 2 840 may transmit, to the terminal 1 820, a signal element for the terminal 1 820, information about an interference channel $h_{21}$ between the terminal 2 840 and the base station 1 810, and information about a transmission power ratio $P_u/E|z_2|^2$ used for the terminal 2 840 to cooperate with the terminal 1 820. In this example, the based station 2 840 may cause interference for the terminal 1 820.

The terminal 2 840 transmits a $Z_2$ signal, obtained by processing a received signal from the base station, to the terminal 1 820 through a cooperation channel.

A signal received by the terminal 2 840 from the base station 1 810 of the cell in which the terminal 1 820 is positioned, functions as an interference element with respect to the terminal 2 840. However, the interference element may also include a signal or data of the terminal 1 820 which desires to receive help. Accordingly, the terminal 2 840 may transmit the $Z_2$ signal to the terminal 1 820 to improve signal quality of the terminal 1 820.

Figure 9:
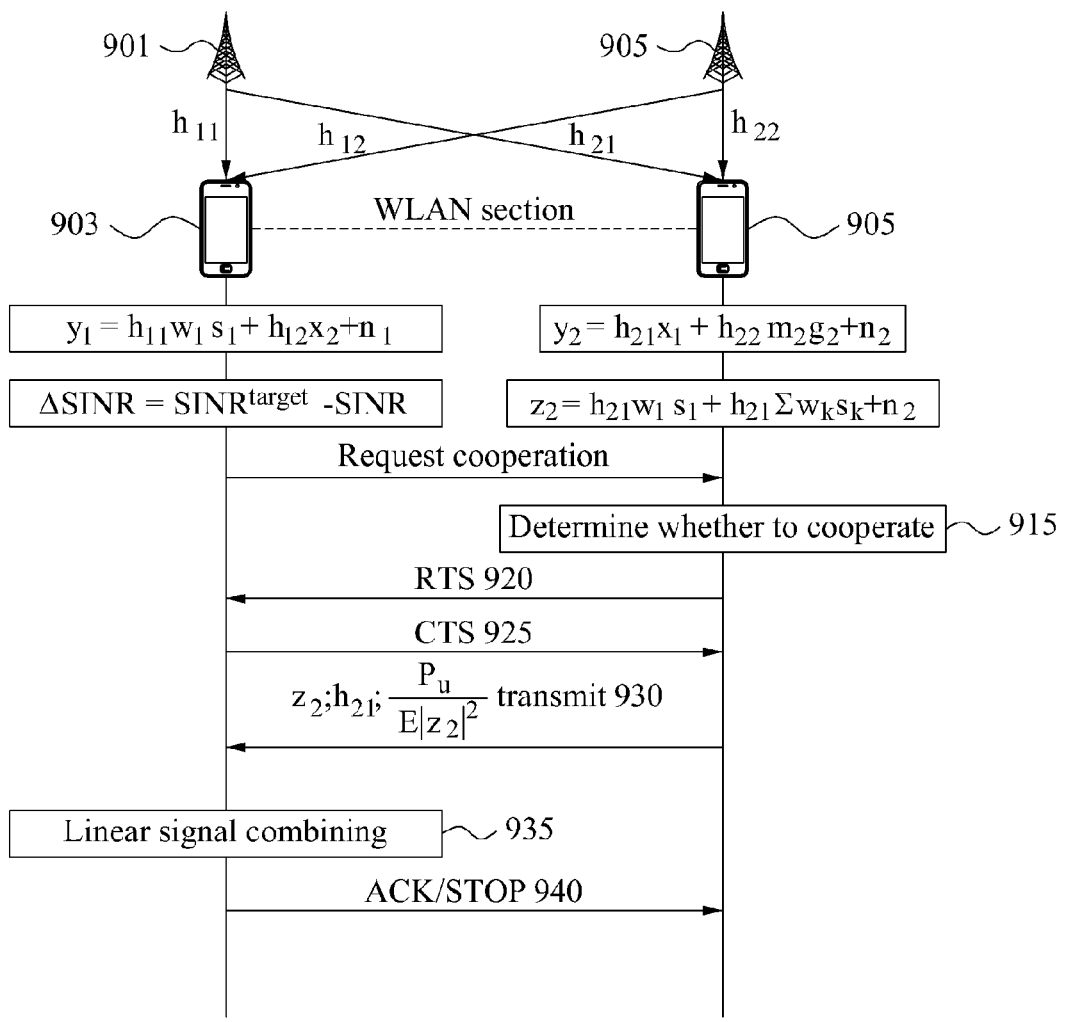
FIG. 9 is a diagram illustrating an example of AF cooperative communication performed in the environment of FIG. 7.

The data mentioned with reference to FIG. 8 is described further with reference to FIG. 9.

FIG. 9 illustrates an example of operations of AF cooperative communication in the environment of FIG. 7.

A communication system in the example of FIG. 9 is a multiuser MISO system, wherein a number of transmission antennas of a base station are $N_T$, and a number of terminals or users are $N_u$. Each terminal has one reception antenna and the base station has a number of transmission antennas satisfying $N_T = N_u$ in a BD scheme for broadcasting.

For example, signals $x_1$, $x_2$ broadcasted by a base station 1 901 and a base station 2 905 for $N_u$ users may be expressed by the following Equation 26.

$$x_1 = w_1 s_1 + w_2 s_2 + \ldots + w_{N_u} s_{N_u}$$

$$x_2 = m_1 g_1 + m_2 g_2 + \ldots + m_{N_u} g_{N_u} \qquad \text{[Equation 26]}$$

In this example, $S_i$ and $g_j$, which are scalar values, respectively denote data or a signal of an i-th terminal that is positioned within a cell coverage of the base station 1 901 and data or a signal of a j-th terminal that is positioned within a cell coverage of the base station 2 905, and $w_i$ and $m_j$ denote a beam-forming vector of a corresponding terminal.

The BD scheme is a broadcasting technique in which there is no interference between terminals in the same cell because a beam-forming vector of one terminal is designed orthogonally to a channel of another terminal that is in the same cell. As described herein, x, w, m are $N_T \times 1$ column vectors.

As shown in FIG. 9, the base station 1 901 broadcasts an $X_1$ signal, the base station 2 905 broadcasts an $X_2$ signal, and terminals positioned at an edge of a cell receive signals from other adjacent base stations as interference signals.

In this example, a MISO channel may be divided into a channel that is formed between a terminal and a base station of the terminal, and an interference channel that is formed between the terminal and a neighboring base station. That is, a channel between the i-th terminal and the base station 1 901 of the i-th terminal may be represented by $h_{i1}$, and an interference channel of the j-th terminal that is positioned in the base station 2 905 from the base station 1 901 may be represented by $h_{I,j1}$. Because a channel from a base station to a terminal is a MISO channel, h is a $1 \times N_T$ row vector. Next, a channel between terminals for cooperation may be represented by $h_u$, and a channel from the j-th terminal to the i-th terminal may be represented by $h_{u,ij}$.

Among the terminals positioned on the cell edge, the i-th terminal that is an (i,1) terminal 903 receives a signal expressed by the following Equation 27.

$$\begin{aligned} y_{i,1} &= h_{i1} x_1 + h_{I,i2} x_2 + n_{i,1} \\ &= h_{i1} w_i s_i + h_{I,i2} x_2 + n_{i,1} \end{aligned} \qquad \text{[Equation 27]}$$

For example, assuming that an interference signal and a noise element with respect to the (i,1) terminal 903, $h_{I,i2} x_2 +$ $n_{i,1}$, are too great to decrease an SINR, so that the (i,1) terminal 903 may not decode received data or signal $S_i$, the (i,1) terminal 903 may receive help from other neighboring terminals. In this example, the (i,1) terminal 903 that receives help from the other terminals is referred to as a "target terminal."

If there is a (j,2) terminal 907 positioned in a cell coverage of another base station, for example, the base station 2 905, on the cell edge, a signal received by the (j,2) terminal 907 may be expressed by the following Equation 28.

$$y_{j,2} = h_{I,j1}x_1 + h_{j2}x_2 + n_{j,2} \qquad \text{[Equation 28]}$$
$$= h_{I,j1}x_1 + h_{j2}m_j g_j + n_{j,2}$$

If the (j,2) terminal 907 has a small interference signal and a small noise element so that an SINR is greater than a target SINR, the (j,2) terminal 907 may decode data or a signal of the (j,2) terminal 907 with high reliability.

For example, assuming that a decoded result by the (j,2) terminal 907 is $\bar{g}_j$, as shown in Equation 29, the (j,2) terminal 907 may remove a signal of the (j,2) terminal 907, that is $h_{j2}m_j \bar{g}_j$, from received signals $y_{j,2}$ to help the (i,1) terminal 903.

$$z_{j,2} = y_{j,2} - h_{j2} m_j \bar{g}_j \qquad \text{[Equation 29]}$$
$$= h_{I,j1}x_1 + n_{j,2}$$
$$= h_{I,j1}w_i s_i + h_{I,j1}\sum_{k \neq i} w_k s_k + n_{j,2}$$

In this example, $z_{j,2}$ is identified to include data $S_i$ desired by the (i,1) terminal 903. Accordingly, in this example, the $z_{j,2}$ signal including $S_i$ is transmitted to the (i,1) terminal 903, and is processed along with a $y_{i,1}$ signal by the (i,1) terminal 903 to improve an SINR of $S_i$.

In order to transmit the $z_{j,2}$ signal to the (i,1) terminal 903 to receive help, the (j,2) terminal 907 may divide the $z_{j,2}$ signal by a power $E|z_{j,2}|^2$ to normalize and transmit the signal as an amount of transmission power $P_u$ through the $h_{u,ij}$ channel. For example, a signal $u_{i,1}$ received by the (i,1) terminal 903 may be expressed by Equation 30.

$$u_{i,1} = \sqrt{\frac{P_u}{E|z_{j,2}|^2}} h_{u,ij}z_{j,2} + n_{u,i,1} \qquad \text{[Equation 30]}$$

$z_2$, described above with reference to FIG. 8, corresponds to $z_2$, and the transmission power ratio $P_u/E|z_2|^2$ corresponds to $P_u/E|z_{j,2}|^2$ in Equation 30. Further, $h_{21}$ of FIG. 8 corresponds to $h_{I,j1}$.

The terminal (i,1) 903 may increase the SINR of the data $S_i$ desired by the terminal (i,1) 903 using linear combination of the received signal $y_{i,1}$ with the signal $u_{i,1}$ that is received through cooperation between terminals.

A result $k_{i,1}$ of the linear combination of the signal $y_{i,1}$ that is received by the (i,1) terminal 903 and the signal $u_{i,1}$ that is received through cooperation between terminals is expressed by the following Equation 31.

$$k_{i,1} = \begin{bmatrix} a_1 & a_2 \end{bmatrix} \begin{bmatrix} y_{i,1} \\ u_{i,1} \end{bmatrix} \qquad \text{[Equation 31]}$$

In this example, linear combination coefficients $a_1$ and $a_2$ of the result $k_{i,1}$ of the linear combination of the signal $y_{i,1}$ and the signal $u_{i,1}$ to maximize the SINR of the data $S_i$ desired by the terminal (i,1) 903 may be obtained through an algorithm suggested below.

Suggested Algorithm

Using results from the above Equation 27, Equation 29, and Equation 30, the result $k_{i,1}$ of the linear combination may be expressed by Equation 32.

$$k_{i,1} = \begin{bmatrix} a_1 & a_2 \end{bmatrix} \begin{bmatrix} y_{i,1} \\ u_{i,1} \end{bmatrix} \qquad \text{[Equation 32]}$$
$$= \begin{bmatrix} a_1 & a_2 \end{bmatrix} \begin{bmatrix} y_{i,1} \\ \sqrt{\frac{P_u}{E|z_{j,2}|^2}} h_{u,ij}z_{j,2} + n_{u,i,1} \end{bmatrix}$$
$$= a_1 h_{i1}w_i s_i + a_1(h_{I,i2}x_2 + n_{i,1}) + a_2\beta h_{u,ij}h_{I,j1}w_i s_i +$$
$$\quad a_2\beta h_{u,ij}\left(h_{I,j1}\sum_{k \neq i} w_k s_k + n_{j,2}\right) + a_2 n_{u,i,1}$$
$$= (a_1 h_{i1}w_i + a_2\beta h_{u,ij}h_{I,j1}w_i)s_i + a_1(h_{I,i2}x_2 + n_{i,1}) +$$
$$\quad a_2\beta h_{u,ij}\left(h_{I,j1}\sum_{k \neq i} w_k s_k + n_{j,2}\right) + a_2 n_{u,i,1}$$

In this example, $\beta = \sqrt{P_u/E|z_{j,2}|^2}$. Thus, Equation 32 is arranged with respect to the SINR of the data $S_i$ by the following Equation 33.

$$SINR = \frac{E|(a_1 h_{i1}w_i + a_2\beta h_{u,ij}h_{I,j1}w_i)s_i|^2}{E|a_1(h_{I,i2}x_2 + n_{i,1}) +} \qquad \text{[Equation 33]}$$
$$\quad a_2\beta_{u,ij}\left(h_{I,j1}\sum_{k \neq i} w_k s_k + n_{j,2}\right) + a_2 n_{u,i,1}\Big|^2$$
$$= \frac{P_s|a_1 h_{i1}w_i + a_2\beta h_{u,ij}h_{I,j1}w_i|^2}{|a_1|^2(h_{I,i2}E|x_2 x_2^H|h_{I,i2}^H + \sigma_{ni,1}^2) +}$$
$$\quad |a_2|^2\beta^2|h_{u,ij}|^2\left(h_{I,j1}E\left|\sum_{k \neq i} w_k s_k \sum_{k \neq i} s_k^* w_k^H\right|h_{I,j1}^H +$$
$$\quad \sigma_{nj,2}^2\right) + |a_2|^2 \sigma_{n,u,i,1}^2$$
$$= \frac{P_s|a_1 h_{i1}w_i + a_2\beta h_{u,ij}h_{I,j1}w_i|^2}{|a_1|^2(P_s h_{I,i2}MM^H h_{I,i2}^H + \sigma_{ni,1}^2) +}$$
$$\quad |a_2|^2\beta^2|h_{u,ij}|^2(P_s h_{I,j1}W_{i-}W_{i-}^H h_{I,j1}^H +$$
$$\quad \sigma_{nj,2}^2) + |a_2|^2 \sigma_{n,u,i,1}^2$$
$$= \frac{|a_1 h_{i1}w_i + a_2\beta h_{u,ij}h_{I,j1}w_i|^2}{|a_1|^2(h_{I,i2}MM^H h_{I,i2}^H + \sigma_{ni,1}^2/P_s) +}$$
$$\quad |a_2|^2\beta^2|h_{u,ij}|^2(h_{I,j1}W_{i-}W_{i-}^H h_{I,j1}^H +$$
$$\quad \sigma_{nj,2}^2/P_s) + |a_2|^2 \sigma_{n,u,i,1}^2/P_s$$

In this example, $M=[m_1 \; m_2 \; \ldots \; m_{N_u}]$, $W_{i-}=[w_1 \; \ldots \; w_{i-1} \; w_{i+1} \; \ldots \; w_{N_u}]$, and for facilitation of the equation, $h_{I,i2} MM^H h_{I,i2}^H + \sigma_{ni,t}^2/P_s = IN_{yi,1}$, $h_{I,j1}W_{i-}W_{i-}^H h_{I,j1}^H + \sigma_{nj,2}^2/P_s = IN_{zj,2}$. Using the above definition, Equation 33 may be expressed by the following Equation 34.

$$SINR = \frac{|(a_1 h_{i1} w_i + a_2 \beta h_{u,ij} h_{I,j1} w_i)|^2}{|a_1|^2 IN_{yi,1} + |a_2|^2(\beta^2|h_{u,ij}|^2 IN_{zj,2} + \sigma_{n,u,i1}^2/P_s)} \quad \text{[Equation 34]}$$

$$= \frac{|(a_1 h_{i1} w_i + a_2 \beta h_{u,ij} h_{I,j1} w_i)|^2}{|a_1|^2 IN_{yi,1} + |a_2|^2 IN_{ui,1}}$$

$$= \frac{[a_1^* \ a_2^*] \begin{bmatrix} w_i^H h_{i1}^H \\ \beta h_{u,ij}^* w_i^H h_{I,j1}^H \end{bmatrix} [h_{i1} w_i \ \beta h_{u,ij} h_{I,j1} w_i] \begin{bmatrix} a_1 \\ a_2 \end{bmatrix}}{[a_1^* \ a_2^*] \begin{bmatrix} IN_{yi,1} & 0 \\ 0 & IN_{ui,1} \end{bmatrix} \begin{bmatrix} a_1 \\ a_2 \end{bmatrix}}$$

In this example, $IN_{ui,1} = \beta^2|h_{u,ij}|^2 IN_{zj,2} + \sigma_{n,u,i,1}^2/P_s$.

$a_1$ and $a_2$ to maximize an SINR by applying a Rayleigh quotient equation in Equation 34 may be expressed by Equation 35.

$$\begin{bmatrix} a_1 \\ a_2 \end{bmatrix} = \text{argmax} SINR \quad \text{[Equation 35]}$$

A solution of Equation 35 may be obtained based on a maximization problem of the Rayleigh quotient equation. For example, if a Matrix Rank between $[a^*_1 \ a^*_2]$ and $$\begin{bmatrix} a_1 \\ a_2 \end{bmatrix}$$

of a denominator is 1 in Equation 34, the solution is obtained as the following Equation 36.

$$\begin{bmatrix} a_1 \\ a_2 \end{bmatrix} = \begin{bmatrix} IN_{yi,1} & 0 \\ 0 & IN_{ui,1} \end{bmatrix}^{-1} \begin{bmatrix} w_i^H h_{i1}^H \\ \beta h_{u,ij}^* w_i^H h_{I,j1}^H \end{bmatrix} \quad \text{[Equation 36]}$$

$$= \begin{bmatrix} \dfrac{w_i^H h_{i1}^H}{IN_{yi,1}} \\ \dfrac{\beta h_{u,ij}^* w_i^H h_{I,j1}^H}{IN_{ui,1}} \end{bmatrix}$$

Based on the above result, the (i,1) terminal 903 may need to know $h_{I,j2}$ and $\beta$ from the (j,2) terminal 907 that is the cooperative terminal that provides help in order to process a signal as in Equation 36. Thus, as illustrated in FIG. 8, the (j,2) terminal 907 may transmit the two values above to the (i,1) terminal 903 through a message.

If a result of Equation 36 is used to maximize the SINR, the maximized SINR may be expressed by Equation 37.

$$SINR_{max} = \frac{|h_{i,1} w_i|^2}{IN_{yi,1}} + \frac{\beta^2|h_{u,ij}|^2|h_{I,j1} w_i|^2}{IN_{ui,1}} \quad \text{[Equation 37]}$$

In this example, a first term $$\frac{|h_{i,1} w_i|^2}{IN_{yi,1}}$$

of Equation 37 is an SINR that is obtained from the received signal $y_{i,1}$, which is smaller than the target SINR, as described above.

Further, a second term $$\frac{\beta^2|h_{u,ij}|^2|h_{I,j1} w_i|^2}{IN_{ui,1}}$$

is an SINR that is obtained from the received signal $u_{i,1}$, which is an SINR gain that is obtained from the (j,2) terminal 907 that provides help.

Thus, Equation 37 may be re-expressed by Equation 38 in order to find an environment to achieve a greater SINR gain.

$$\frac{\beta^2|h_{u,ij}|^2|h_{I,j1} w_i|^2}{IN_{ui,1}} = \frac{\beta^2|h_{u,ij}|^2|h_{I,j1} w_i|^2}{\beta^2|h_{u,ij}|^2 IN_{zj,2} + \sigma_{n,u,i,1}^2/P_2} \quad \text{[Equation 38]}$$

$$= \frac{|h_{I,j1} w_i|^2}{IN_{zj,2} + \dfrac{E|z_{j,2}|^2 \sigma_{n,u,i,1}^2}{P_s P_u |h_{u,ij}|^2}}$$

In this example, if a channel for communication between terminals has a good condition, or an SNR is high, $$\frac{P_u|h_{u,ij}|^2}{\sigma_{n,u,i,1}^2} \to \infty.$$

In this example, $\sigma_{n,u,i,1}^2$ corresponds to noise power that is described above with reference to FIG. 8. Thus, the (i,1) terminal 903 may obtain a maximum SINR gain expressed by the following Equation 39.

$$\frac{|h_{I,j1} w_i|^2}{IN_{zj,2}} = \frac{|h_{I,j1} w_i|^2}{h_{I,j1} W_{i-} W_{i-}^H h_{I,j1}^H + \sigma_{nj,2}^2/P_s} \quad \text{[Equation 39]}$$

In the above equation, a beam-forming vector $W_{i-}$ may be designed to be orthogonal to the channel $h_{i1}$ of the base station 1. Thus, when the interference channel $h_{I,j1}$ is similar to $h_{i1}$, a value of $h_{I,j1} W_{i-} W_{i-}^H h_{I,j1}^H$ may be close to 0, and a greater SINR gain may be obtained.

The extent of similarity between two channels may be defined as a channel similarity $\epsilon$, which is a result of a dot product of two vectors that are defined by the following Equation 40.

$$\epsilon = |d_{i1} d_{I,j1}^H| \quad \text{[Equation 40]}$$

where $d_{i1} = h_{i1}/|h_{i1}|$, $d_{I,j1} = h_{I,j1}/|h_{I,j1}|$

In this example, $\epsilon$ may have a value from 0 to 1.

Figure 10:
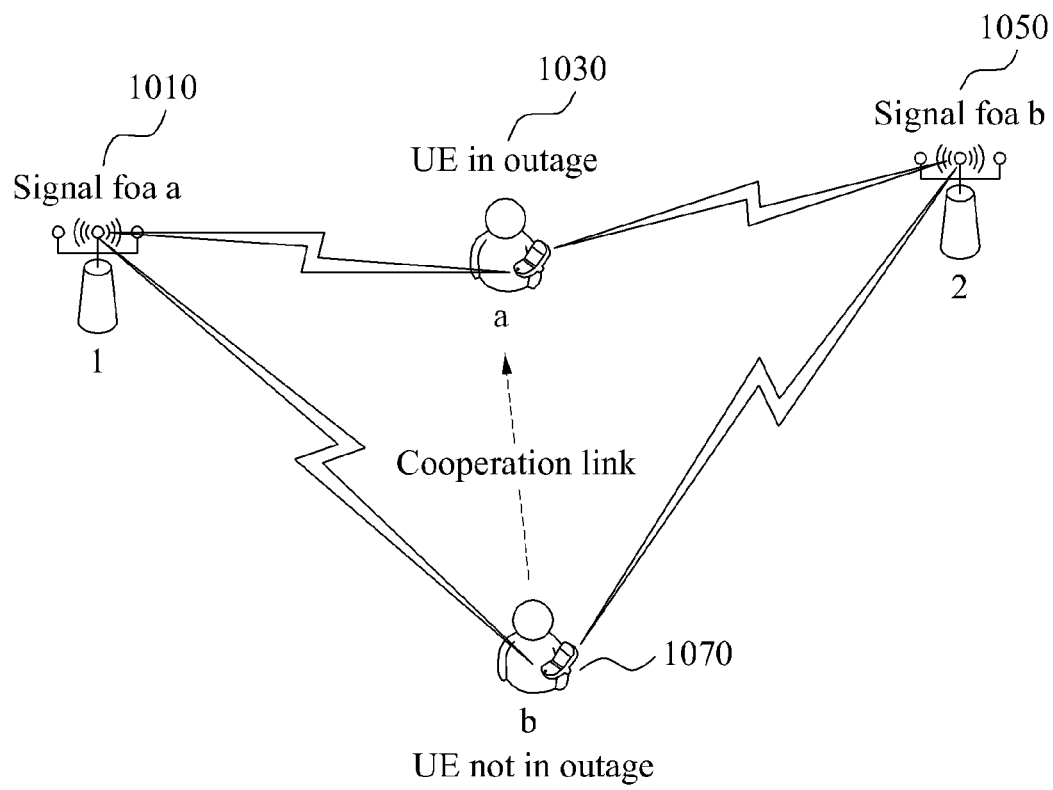
FIG. 10 is a diagram illustrating an example of cooperative communication based on a decide-and-forward (DF) mode.

FIG. 10 illustrates an example of cooperative communication that is based on a DF mode.

In order to broaden a coverage area of a macro cell and to reduce a fringe area, a method of installing a base station of a femto cell or a pico cell at any user desired place and time may be used. A femto cell using a small amount of transmission power has a coverage area of tens of meters. Accordingly, a user may optionally install a base station, and thus femto cells may be positioned close to each other. Thus, a user positioned on a boundary area may receive strong interference.

In order to solve the outage, a cooperation mode using transmission of an interference signal may be used between cooperating terminals.

In FIG. 10, terminal a 1030 has an outage and a terminal b 1070 successively decodes data. In this example, the outage may be solved using an interference signal. As described above, if a base station 1 1010 and a base station 2 1050 transmit data to the terminal a 1030 and the terminal b 1070, respectively, the terminal b 1070 and the terminal a 1030 may communicate directly with each other to resolve the outage.

Figure 11:
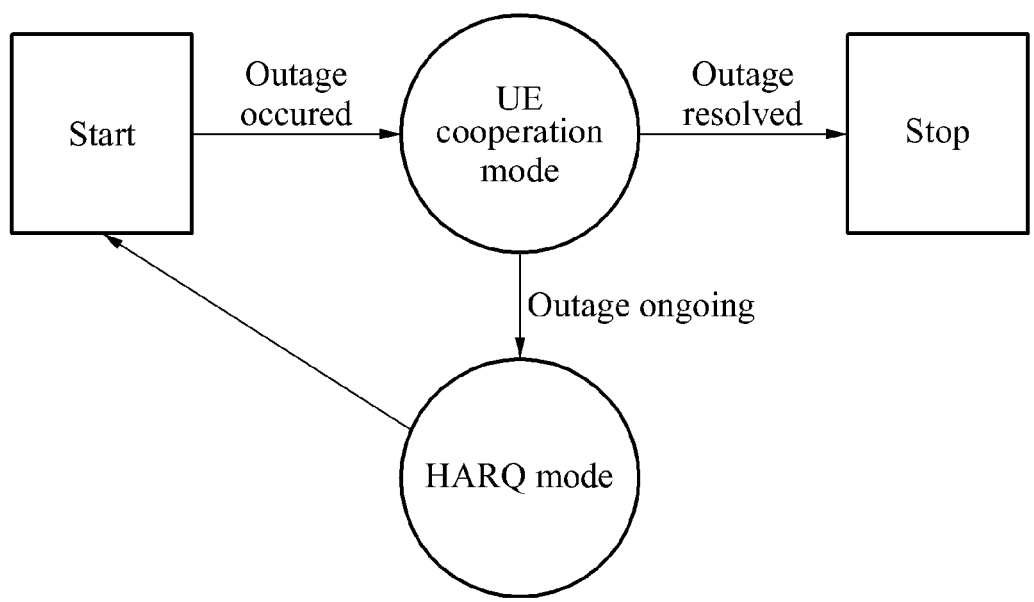
FIG. 11 is a diagram illustrating an example of a state of cooperative communication being performed.

For example, if the base station 1 1010 serves the terminal a 1030 and the base station 2 1050 serves the terminal b 1070 and a terminal c (not shown), the terminal b 1070 and the terminal c may perform an operation to help the terminal a 1030 that has the outage, as shown in FIG. 11.

FIG. 11 illustrates an example of cooperative communication being performed.

Referring to FIG. 11, if a target terminal requests a neighboring terminal for cooperation to resolve an outage, the cooperative terminal may resolve the outage through cooperative communication with the target terminal. The target terminal may request a base station for a hybrid automatic repeat request (HARQ), if the outage is not resolved through cooperation with the neighboring terminal.

Here, the following conditions are assumed with respect to the system shown in FIGS. 10 and 11. There are a plurality of base stations and a plurality of terminals, wherein each base station transmits a signal to each terminal using the same frequency through a plurality of antennas, and all base stations and all terminals are correctly aware of all channel information and have the channel information in synchronization. All the signal models may be expressed by an equation using a Complex baseband-equivalent model, and noise may be expressed by a random variable that is based on a circular symmetric normal distribution having an average of 0 and a distribution of 1. All terminals have a target SNR to accommodate traffic. Thus, when a received signal has quality smaller than the target SNR, an outage occurs.

Figure 12:
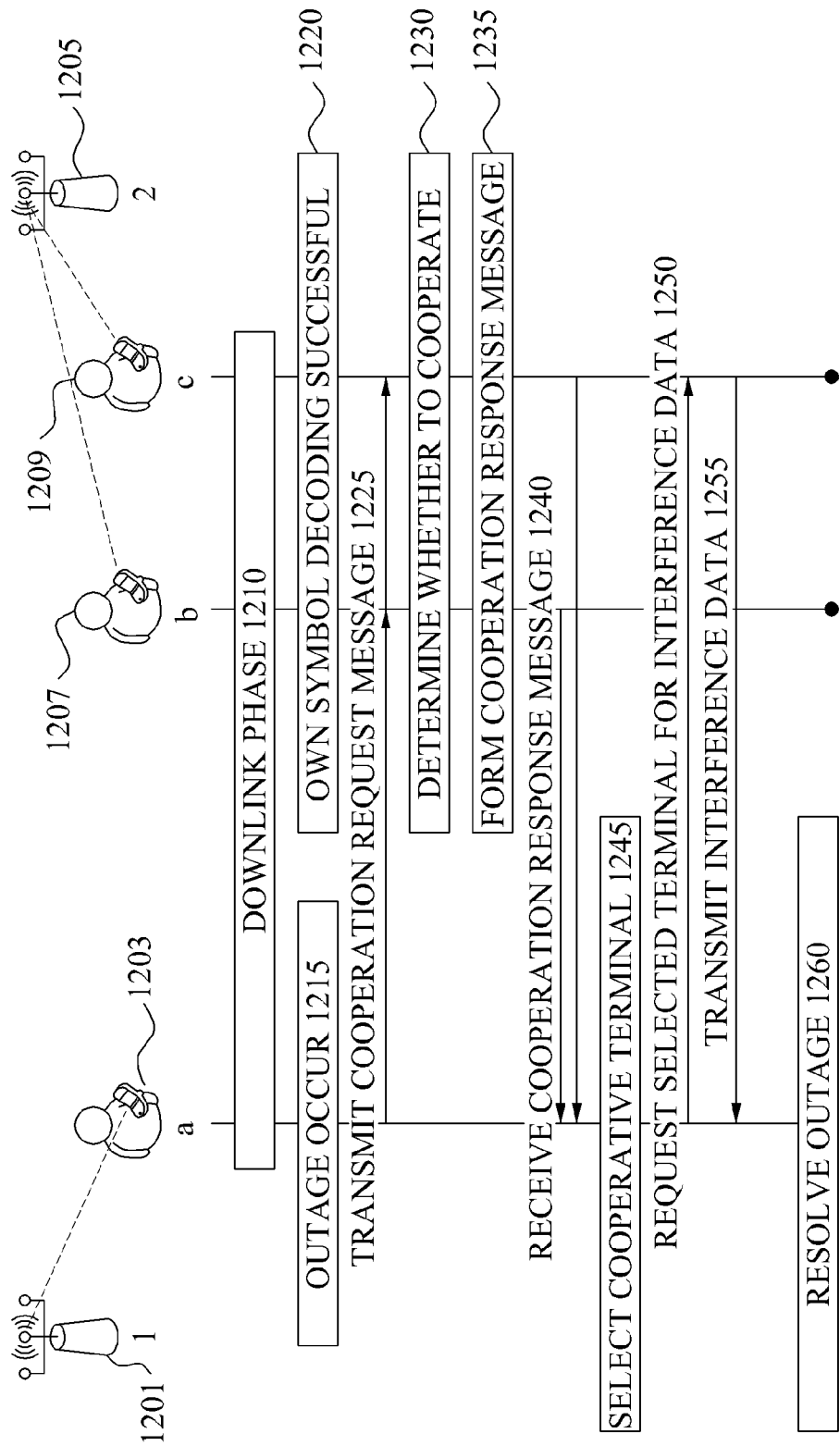
FIG. 12 is a diagram illustrating an example of cooperative communication in which a target terminal and a cooperative terminal cooperate with each other based on a DF mode.

FIG. 12 illustrates an example of cooperative communication in which a target terminal and a cooperative terminal cooperate with each other based on a DF mode.

Referring to FIG. 12, base station 1 1201 serves terminal a 1203, base station 2 1205 serves a terminal b 1207 and a terminal c 1209 using a 3G network, and the respective terminals are connected via a Wi-Fi network. Further, the respective base stations 1201 and 1205 may transmit a single data stream to the respective terminals through a downlink. In this example, the terminal a 1203 has an outage, and the terminal b 1207 and the terminal c 1209 are in a communicable state. The terminal a 1203 transmits a cooperation request message to the terminal b 1207 and the terminal c 1209 through the Wi-Fi network. In this example, a cooperation mode 1 and a cooperation mode 2 are predetermined.

In FIG. 12, the network may be expressed as an equivalent MISO channel, and may be an MISO channel model through an adequate receiving beam formation even if each terminal has multiple antennas. In this example, a signal $y_a$ received by the terminal a 1203 may be expressed by Equation 41.

$$y_a = h_{1a}^H V_{1a} x_{1a} + h_{2a}^H (V_{2b} x_{2b} + V_{2c} x_{2c}) + z_a \qquad \text{[Equation 41]}$$

Here, $h_{ij}$ denotes a channel from a base station i to a terminal j in the downlink, $V_{ij}$ denotes an MISO beam vector that is used for the base station i to serve the terminal j, $x_{ij}$ denotes data to be transmitted by the base station i to the terminal j, and $z_a$ denotes white noise that is received by the terminal a 1203.

Further, if the base station 2 1205 applies a beam vector based on an zero-forcing based space-division multiple access, a signal of the terminal b 1207 and a signal of the terminal c 1209 may be expressed by Equation 42.

$$y_b = h_{1b}^H V_{1a} x_{1a} + h_{2b}^H V_{2b} x_{2b} + z_b$$

$$y_c = h_{1c}^H V_{1a} x_{1a} + h_{2c}^H V_{2c} x_{2c} + z_c \qquad \text{[Equation 42]}$$

In addition, a communication condition of the terminal a 1203 may be expressed by Equation 43.

$$SNR_a = \frac{(h_{1a}^H Q_{1a} h_{1a}) P_{1a}}{(h_{2a}^H Q_{2b} h_{2a}) P_{2b} + (h_{2a}^H Q_{2c} h_{2a}) P_{2c} + 1} \geq \bar{\gamma}_a \qquad \text{[Equation 43]}$$

In this example, $P_{ij}$ denotes transmission power allocated by the base station i to the terminal j, $\bar{\gamma}_a$ is a target SNR, and $Q_{ij} = V_{ij} V_{ij}^H$. On the contrary, if an inequality sign is reversed in Equation 43, an outage occurs.

Further, communication conditions of the terminal b 1207 and the terminal c 1209 may be expressed by Equation 44.

$$SNR_k = \frac{(h_{2k}^H Q_{2k} h_{2k}) P_{2k}}{(h_{1k}^H Q_{1a} h_{1k}) P_{1a} + 1} \geq \bar{\gamma}_k, k \in \{b, c\} \qquad \text{[Equation 44]}$$

If the terminal b 1207 and the terminal c 1209 satisfy Equation 44, cooperation with the terminal a 1203 may be determined to be possible. In one example, it is assumed that only the terminal b 1207 satisfies Equation 44.

In this example, the terminal b 1207 may define data decoded by the terminal b 1207 as a cooperation message and may transmit the data to the terminal a 1203 through the Wi-Fi network. In this example, a signal $y_{ba}$ that is received by the terminal a 1203 from the terminal b 1207 may be expressed by Equation 45.

$$y_{ba} = h_{ba} \vec{\sqrt{P_b}} x_{2b} + z_{ba} \qquad \text{[Equation 45]}$$

Here, $h_{ba}$ is a channel between the terminal b 1207 and the terminal a 1203, $P_b$ is transmission power that is used by the terminal b for cooperation, and $z_{ba}$ is white i noise in a cooperation channel.

The network between the terminal b 1207 and the terminal a 1203 is based on Wi-Fi, and thus, single data may be transmitted in each time based on a carrier sense multiple access (CSMA). In this example, it is assumed that the received signal $y_{ba}$ does not include an interference signal, and cooperative communication between the terminal b 1207 and the terminal a 1203 is single-antenna communication.

The terminal a 1203 may perform cooperative communication if Equation 46 is satisfied.

$$SNR_{ba} = |h_{ba}|^2 P_b \geq \bar{\gamma}_b \qquad \text{[Equation 46]}$$

Because the terminal a 1203 obtains interference data, an interference element may be eliminated from the received signal $y_a$ expressed by Equation 41. The terminal a 1203 may use the following two methods to remove the interference element from the received signal $y_a$.

Suggested Method 1: Analog ELIMINATION

The method 1 is a process in which signal elements of a cooperative terminal, that is, the received signal $y_{ba}$, are linearly combined, and an interference element with respect to the signal $y_a$ received by the terminal a 1203 of a target terminal is removed in cooperative communication. Linear combination coefficients $\alpha_a$ and $\alpha_b$ may be expressed by Equation 47.

$$[\alpha_a \ \alpha_b]\begin{bmatrix} y_a \\ y_{ba} \end{bmatrix} = \alpha_a y_a + \alpha_b y_{ba} \qquad \text{[Equation 47]}$$

In this example, $\alpha_a$ and $\alpha_b$ are properly set to satisfy $\|[\alpha_a \; \alpha]\|=1$, so that $x_{2b}$ may be removed, and a condition thereof may be expressed by Equation 48.

$$h_{2a}^H V_{2b} + \frac{\alpha_b}{\alpha_a} h_{ba} \sqrt{P_b} = 0 \qquad \text{[Equation 48]}$$

Therefore, a signal obtained where $$\frac{\alpha_b}{\alpha_a} = -\frac{h_{2a}^H V_{2b}}{h_{ba}\sqrt{P_b}},$$

is given $$h_{1a}^H V_{1a} x_{1a} + z_a + \frac{\alpha_b}{\alpha_a} z_{ba} + h_{2a}^H V_{2c} x_{2c},$$

and an SNR of a received signal increases to $$\frac{h_{1a}^H Q_{1a} h_{1a} P_{1a}}{h_{2a}^H Q_{2c} h_{2a} P_{2c} + 1 + \left|\frac{\alpha_b}{\alpha_a}\right|^2}.$$

Equation 48 identifies that a value from multiplication of transmission power $P_b$ of the terminal b 1207 by a linear combination coefficient $$\frac{\alpha_b}{\alpha_a}$$

is constant.

Thus, if the transmission power $P_b$ of the terminal b 1207 is great, the linear combination coefficient $$\frac{\alpha_b}{\alpha_a}$$

is small, so that smaller noise is amplified in the SNR of the received signal of the terminal a 1203 after cooperation in order to more favorably resolve an outrage.

On the contrary, if the transmission power $P_b$ of the terminal b 1207 is small, the linear combination coefficient $$\frac{\alpha_b}{\alpha_a}$$

is great, so that greater noise is amplified in the SNR of the received signal of the terminal a 1203 after cooperation to unfavorably resolve an outrage. However, if the transmission power $P_b$ of the terminal b 1207 is small, a battery of the terminal b 1207 may be saved. Thus, a practical operation may be performed based on conditions of the terminal a 1203 and the terminal b 1207.

For example, a minimum power used for the terminal b 1207 to resolve the outage of the terminal a 1203 may be expressed by $$P_b \geq \frac{\frac{h_{2a}^H Q_{2b} h_{2a} P_{2b}}{|h_{ba}|^2}}{\frac{h_{1a}^H Q_{1b} h_{1a} P_{1a}}{\overline{\gamma}_a} - h_{2a}^H Q_{2c} h_{2a} P_{2b} - 1}.$$

Further, a plurality of terminals, for example, the terminal b 1207 and the terminal c 1209, may cooperate with the terminal a 1203 using a minimum total power based on $$[\alpha_a \; \alpha_b \; \alpha_c] \begin{bmatrix} y_a \\ y_{ba} \\ y_{ca} \end{bmatrix} = \alpha_a y_a + \alpha_b y_{ba} + \alpha_c y_{ca}.$$

The transmission power $p_b$ and $p_c$, and the linear combination coefficients $\alpha_a$, $\alpha_b$, $\alpha_c$ may be determined through optimization using Equation 49.

$$\min \left\{ P_b + P_c \; \middle| \; \overline{\gamma}_a \leq \frac{\frac{h_{1a}^H Q_{1a} h_{1a} P_{1a}}{|h_{ba}|^2}}{1 + \left|\frac{\alpha_b}{\alpha_a}\right|^2 + \left|\frac{\alpha_c}{\alpha_a}\right|^2}, \ldots, \frac{\alpha_b}{\alpha_a}\sqrt{P_b} = -\frac{h_{2a}^H V_{2b}}{h_{ba}}, \ldots, \frac{\alpha_c}{\alpha_a}\sqrt{P_c} = -\frac{h_{2a}^H V_{2c}}{h_{ca}} \right\} \qquad \text{[Equation 49]}$$

In this example, $\|[\alpha_a \; \alpha_b \; \alpha_c]\|=1$ may be satisfied, and an optimized value as n Equation 49 may be used regardless of a number of cooperative terminals. As described herein, the target terminal of the terminal a 1203 may adjust a quality of a signal of the target terminal based on the transmission power with respect to signal elements for the terminal b 1207 and/or the terminal c 1209 and the linear combination coefficients used for the linear combination.

Hereinafter, the other method of the terminal a 1203 removing the interference element from the received signal $y_a$ is described.

Suggested Method 2: Digital Elimination

According to the method 2, if Equation 46 is satisfied from the received signal of the cooperative communication in Equation 45, $x_{2b}$ may be decoded, and an interference element $h_{2a}{}^H V_{2b} x_{2b}$ with respect to the terminal a 1203 may be re-combined using already known channel information $h_{2a}$ and a beam vector $V_{2b}$ that is received from the terminal b 1207.

The recombinant interference element may be removed from Equation 41 to increase an SNR, which increases to $$\frac{h_{1a}^H Q_{1a} h_{1a} P_{1a}}{h_{2a}^H Q_{2c} h_{2a} P_{2c} + 1}.$$

Likewise, the digital elimination may be easily applied in cooperation between a plurality of terminals.

Among the method 1 and the method 2, the method 1 may be more favorable in respect of complexity, and the method 2 may be more favorable in respect of SNR. Thus, a proper method may be selectively used in operation.

Referring to FIG. 12, among terminals performing downlink communication with the respective base stations, in 1210, the terminal a 1203 has an outage, in 1215, and the respective remaining terminals, for example, the terminal b 1207 and the terminal c 1209, successfully decode signals, in 1220.

The terminal a 1203 transmits a cooperation request message to the terminal b 1207 and the terminal c 1209, in 1225.

The terminal b1207 and the terminal c 1209 receiving the cooperation request message from the terminal a 1203 determine in advance whether to cooperate through calculation using Equation 46, in 1230. If cooperation with the terminal a 1203 is possible, the terminal 1207 and/or the terminal c 1209 forms a cooperation response message, in 1235, and transmits the message to the terminal a 1203, in 1240.

In this example, each cooperation response message formed by the terminal b 1207 or the terminal c 1209 may be different based on an interference elimination method used by the terminal b 1207 or the terminal c 1209.

For example, if each terminal uses the method 1, a cooperation response message of the terminal b 1207 and a cooperation response message of the terminal c 1209 respectively include linear combination coefficients $\alpha_b$ and $\alpha_c$ to be used by the terminal a 1203. In this example, the terminal a 1203 may normalize $\alpha_a=1$ to simplify calculation.

If the method 2 is used, the cooperation response message of the terminal b 1207 and the cooperation response message of the terminal c 1209 may respectively include beam vectors $V_{2b}$ and $V_{2c}$ to be used by the terminal a 1203.

The terminal a 1203 receiving the cooperation response message selects a terminal to cooperate with, that is, a cooperative terminal, in order to resolve the outage, in 1245.

For example, the cooperative terminal may be selected through calculation using Equation 44 to Equation 49.

Through the calculation using the equations, if the terminal c 1209 is selected as the cooperative terminal, the terminal a 1203 requests the terminal c 1209 for interference data through the Wi-Fi network, in 1250.

The terminal c 1209 receives the request for the interference data, and then transmits a cooperation message including the interference data to the terminal a 1203 through the Wi-Fi network, in 1255.

Accordingly, the terminal a 1203 resolves the outage by eliminating an interference signal transmitted by the base station 2 1205 to the terminal c 1209 from a previous received signal, in 1260.

Figure 13:
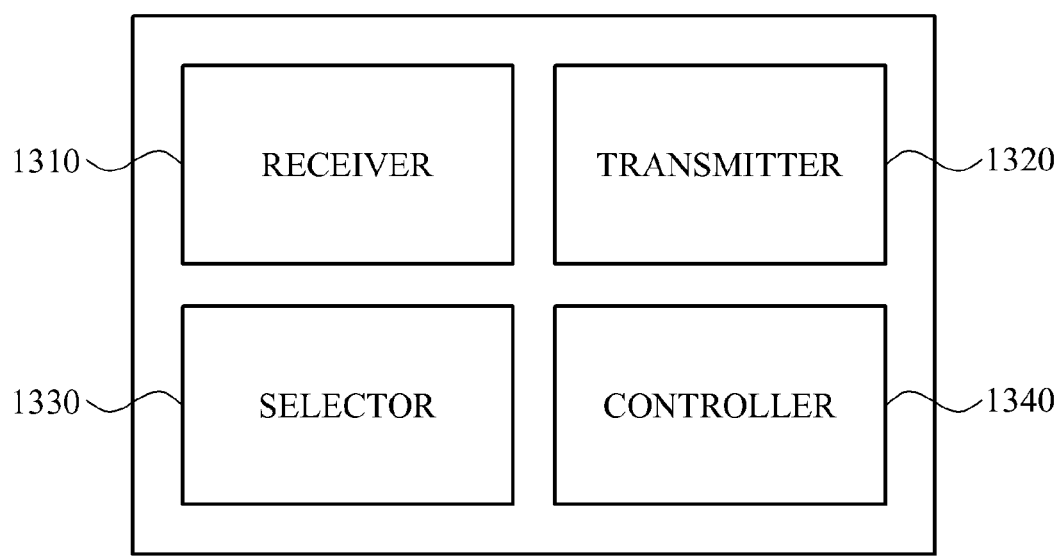
FIG. 13 is a diagram illustrating an example of a target terminal.

FIG. 13 illustrates an example of a target terminal.

Referring to FIG. 13, terminal 1300 includes a receiver 1310, a transmitter, 1320, a selector 1330, and a controller 1340. The target terminal 1300 may receive help in a cooperative communication environment from a cooperating terminal.

The receiver 1310 may receive a signal from a base station that serves the terminal 1300. The controller 1340 may determine a signal quality of a signal received from the base station. For example, the controller 1340 may determine the signal quality by comparing the signal quality of the signal received from the base station with a preset threshold, and determine to request cooperation from the at least one neighboring base station if the signal quality is below the preset threshold.

The transmitter 1320 may transmit a request for cooperation from at least one neighboring terminal. In this example, the signal received from the base station may be received via a first network such as a cellular network, and the request for cooperation may be transmitted via a second network such as a BLUETOOTH® network or a wireless local area network (WLAN). By using different networks to transmit the request, interference may be prevented.

One or more neighboring terminals may transmit cooperation information to the target terminal 1300 and the cooperation information may be received by the receiver 1310. The selector 1330 may select a neighboring terminal from the one or more neighboring terminals as a cooperative terminal, based on the cooperation information received from the one or more neighboring terminals. For example, the receiver 1310 may receive information indicating that a plurality of neighboring nodes are available to cooperate, and information about the amount of power used by each of the cooperative terminals. In this example, the selector 1330 may select a neighboring terminal to cooperate based on the amount of power used by each of the neighboring terminals. The transmitter 1320 may transmit an indication to the determined terminal to cooperate.

The receiver 1310 may receive signal data from the cooperative terminal to strengthen the signal quality of the signal that is received from the base station. For example, the additional signal may include a signal transmitted from the base station to the target terminal 1300 that was received by the cooperative terminal. The signal data may be amplified by the cooperative terminal.

In another example, the signal data may include a signal that interferes with a signal transmitted from the base station to the target terminal 1300. The target terminal 1300 may use the interference signal to remove noise from the signal received from the base station.

The examples described with reference to FIGS. 1-12 are also applicable to the target terminal 1300 that is described with reference to FIG. 13.

According to various examples described herein, if there is interference between cells in a multi-cell or heterogeneous cell environment, cooperation between terminals may be used to improve quality of received data.

In various examples, a signal to interference plus noise ratio (SINR) of a terminal receiving interference may be increased through cooperation between terminals to enhance a transmission rate.

In various examples, in cooperative communication between terminals, a cooperation terminal to perform cooperative communication may be selected based on the amount of transmission power of the cooperative terminal to minimize energy used by the cooperative terminal.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The processes, functions, methods and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A cooperative communication method of a target terminal, the method comprising:
   requesting at least one neighboring terminal for cooperation based on signal quality between the target terminal and a serving base station of the target terminal;
   obtaining, from the at least one neighboring terminal, information about a cooperation mode between the target terminal and the at least one neighboring terminal and information about an amount of transmission power to be used by the at least one neighboring terminal, based on the cooperation mode;
   selecting a cooperative terminal to cooperate with the target terminal from among the at least one neighboring terminal based on the obtained information; and
   performing cooperative communication with the cooperative terminal based on a cooperation mode corresponding to the cooperative terminal.

2. The method of claim 1, wherein the cooperation mode comprises at least one of an amplify-and-forward (AF) cooperation mode in which the cooperative terminal transmits a signal element for the target terminal, to the target terminal, and a decode-and-forward (DF) cooperation mode in which the cooperative terminal transmits a signal element for the cooperative terminal that acts as interference on the target terminal, to the target terminal.

3. The method of claim 2, further comprising:
   calculating a difference between preset target signal quality and the signal quality between the target terminal and the serving base station of the target terminal in each of the AF cooperation mode and the DF cooperation mode, wherein the requesting of the at least one neighboring terminal for cooperation comprises broadcasting a message including at least one of information about the difference in signal quality in each of the AF cooperation mode and the DF cooperation mode, an address of the target terminal, an identification (ID) of the serving base station of the target terminal, and an ID of a base station of the at least one neighboring terminal.

4. The method of claim 1, further comprising:
   transmitting, to the cooperative terminal, a message including information about a channel between the target terminal and the cooperative terminal and information about a start time and a termination time of the cooperative communication between the target terminal and the cooperative terminal.

5. The method of claim 1, further comprising:
   transmitting, to the cooperative terminal, a message including a beam-forming vector of the target terminal and noise power of the target terminal, in response to the cooperation mode being an AF cooperation mode in which the cooperative terminal transmits a signal element for the target terminal, to the target terminal.

6. The method of claim 5, further comprising:
   calculating a linear combination coefficient to improve the signal quality of the target terminal using the signal element for the target terminal, information about an interference channel between the cooperative terminal and the serving base station of the target terminal, and a transmission power ratio of the cooperative terminal with respect to the signal element for the target terminal.

7. The method of claim 6, further comprising:
   linear-signal-combining the signal element for the target terminal with a signal received by the target terminal from the serving base station using the linear combination coefficient.

8. The method of claim 1, further comprising:
   receiving, from the cooperative terminal, a message including a signal element for the cooperative terminal that acts as interference on the target terminal, information about a channel between the cooperative terminal and the target terminal, and information about an amount of transmission power of the cooperative terminal, in response to the cooperation mode being a DF cooperation mode.

9. The method of claim 8, further comprising:
   removing interference of the target terminal using the signal element for the cooperative terminal.

10. The method of claim 9, wherein the removing of the interference of the target terminal removes the interference by linearly-combining the signal element for the cooperative terminal.

11. The method of claim 10, wherein the removing of the interference of the target terminal further comprises adjusting the signal quality of the target terminal based on transmission power with respect to the signal element for the cooperative terminal and a linear combination coefficient used for the linear combination.

12. The method of claim 9, wherein the removing of the interference of the target terminal comprises:
   re-combining an interference element with respect a channel between a base station of the cooperative terminal and the target terminal using information about the channel between the base station of the cooperative terminal and the target terminal and a beam-forming vector of the cooperative terminal; and removing the recombinant interference element from a signal received by the target terminal to improve the signal quality of the target terminal.

13. A cooperative communication method of a cooperative terminal, the method comprising:
receiving a cooperation request from a target terminal;
identifying whether to cooperate with the target terminal, in response to the cooperation request;
selecting a cooperation mode between the target terminal and the cooperative terminal;
transmitting, to the target terminal, information about the cooperation mode and information about an amount of transmission power to be used by the cooperative terminal, based on the cooperation mode; and
performing cooperative communication with the target terminal based on the cooperation mode.

14. The method of claim 13, wherein the cooperation mode comprises at least one of an amplify-and-forward (AF) cooperation mode in which the cooperative terminal transmits a signal element for the target terminal, to the target terminal, and a decode-and-forward (DF) cooperation mode in which the cooperative terminal transmits a signal element for the cooperative terminal that acts as interference on the target terminal, to the target terminal.

15. The method of claim 13, wherein the receiving of the cooperation request comprises receiving a message including at least one of information about a difference between preset target signal quality and signal quality between the target terminal and a serving base station in each of the AF cooperation mode and the DF cooperation mode, an address of the target terminal, an identification (ID) of the serving base station of the target terminal, and an ID of a base station of the cooperative terminal.

16. The method of claim 13, wherein the identifying of whether to cooperate with the target terminal comprises comparing preset target signal quality with signal quality between the cooperative terminal and a base station of the cooperative terminal.

17. The method of claim 15, further comprising:
measuring an interference-to-noise ratio (INR) with respect to a channel between the cooperative terminal and the serving base station of the target terminal based on a pilot signal that is received from the serving base station of the target terminal.

18. The method of claim 17, wherein the selecting of the cooperation mode between the target terminal and the cooperative terminal comprises:
selecting the cooperation mode between the target terminal and the cooperative terminal based on the INR and the difference between the preset target signal quality and the signal quality between the target terminal and the serving base station of the target terminal in each of the AF cooperation mode and the DF cooperation mode; and
determining the transmission power to be used by the cooperative terminal in each of the AF cooperation mode and the DF cooperation mode.

19. The method of claim 18, wherein the selecting of the cooperation mode between the target terminal and the cooperative terminal comprises selecting a mode in which the transmission power to be used by the cooperative terminal is less consumed among the AF cooperation mode and the DF cooperation mode.

20. The method of claim 14, further comprising:
receiving, from the target terminal, information including a beam-forming vector of the target terminal and noise power of the target terminal, in response to the cooperation mode being the AF cooperation mode.

21. The method of claim 20, wherein the identifying of whether to cooperate with the target terminal comprises:
calculating a signal quality gain to be obtained by the target terminal using the beam-forming vector of the target terminal and the noise power of the target terminal; and
identifying whether to cooperate with the target terminal based on a result of the calculation.

22. The method of claim 20, further comprising:
transmitting, to the target terminal, a signal element for the target terminal, information about an interference channel between the cooperative terminal and a serving base station of the target terminal, and information about a transmission power ratio of the cooperative terminal with respect to the signal element for the target terminal.

23. The method of claim 13, further comprising:
transmitting, to the target terminal, a message including a signal element for the cooperative terminal that acts as interference on the target terminal, information about a channel between the cooperative terminal and the target terminal, and information about the amount of transmission power of the cooperative terminal, in response to the cooperation mode being a DF cooperation mode.

24. A non-transitory computer-readable storage medium comprising program instructions to cause a processor to implement a method comprising:
requesting at least one neighboring terminal for cooperation based on signal quality between the target terminal and a serving base station of the target terminal;
obtaining, from the at least one neighboring terminal, information about a cooperation mode between the target terminal and the at least one neighboring terminal and information about an amount of transmission power to be used by the at least one neighboring terminal, based on the cooperation mode;
selecting a cooperative terminal to cooperate with the target terminal from among the at least one neighboring terminal based on the obtained information; and
performing cooperative communication with the cooperative terminal based on a cooperation mode corresponding to the cooperative terminal.

25. A target terminal in a cooperative communication environment that receives a signal from a base station that serves the target terminal, the target terminal comprising:
a transmitter configured to transmit a request for cooperation to one or more neighboring terminals;
a receiver configured to receive cooperation information from at least one of the neighboring terminals, the cooperation information comprising a cooperation mode of the at least one neighboring terminal and information about an amount of transmission power to be used by the at least one neighboring terminal to perform the cooperation mode; and
a selector configured to select a neighboring terminal from the at least one neighboring terminals as a cooperative terminal, based on the cooperation information received from the one or more neighboring terminals.

26. The target terminal of claim 25, wherein the signal data comprises a signal transmitted from the base station to the target terminal that was received by the cooperative terminal, and the signal data has been amplified by the cooperative terminal.

27. The target terminal of claim 25, wherein the signal data comprises a signal that interferes with a signal transmitted from the base station to the target terminal, and the target terminal uses the interference signal to remove noise from the signal received from the base station.

28. The target terminal of claim 25, further comprising a controller configured to determine the signal quality of the signal received from the base station by comparing the signal quality of the signal received from the base station with a preset threshold.

29. The target terminal of claim 25, wherein the receiver receives cooperation information indicating that a plurality of neighboring terminals are available to cooperate, and information about the amount of power to be used by each of the neighboring terminals during cooperation, and the selector selects the cooperative terminal based on the amount of power to be used by each of the neighboring terminals.

30. The target terminal of claim 25, wherein the receiver is further configured to receive signal data from the cooperative terminal to strengthen the signal quality of the signal that is received from the base station.

31. The target terminal of claim 25, wherein the signal received from the base station is received via a cellular network, and cooperation information received from the one or more neighboring terminals is received via a BLUETOOTH® network or a WLAN.

32. The target terminal of claim 25, wherein the selector determines a cooperation mode from among a plurality of cooperation modes for the cooperative communication based on the cooperation information received from the one or more neighboring terminals.

33. The target terminal of claim 32, wherein the plurality of cooperation modes comprise an amplify-and-forward (AF) cooperation mode in which the cooperative terminal transmits a signal element for the target terminal, to the target terminal, and a decode-and-forward (DF) cooperation mode in which the cooperative terminal transmits a signal element for the cooperative terminal that acts as interference on the target terminal, to the target terminal.

34. The target terminal of claim 25, wherein the selector is configured to select a neighboring terminal consuming the least amount of transmission power during the cooperation mode, from among a plurality of neighboring terminals, as the cooperative terminal.

* * * * *